US010223658B2

(12) United States Patent
Cornilescu

(10) Patent No.: US 10,223,658 B2
(45) Date of Patent: Mar. 5, 2019

(54) CONTINUOUS INTEGRATION SOFTWARE DEVELOPMENT PLATFORM AND SYSTEM, AND IMPLEMENTATION METHOD THEREFOR

(71) Applicant: APARTSW CONSULTING INC., Kanata (CA)

(72) Inventor: Dan Iulian Cornilescu, Ontario (CA)

(73) Assignee: APARTSW CONSULTING INC., Kanata, Ontario (CA)

( * ) Notice: Subject to any disclaimer, the term of this patent is extended or adjusted under 35 U.S.C. 154(b) by 115 days.

(21) Appl. No.: 15/376,426

(22) Filed: Dec. 12, 2016

(65) Prior Publication Data
US 2017/0169370 A1 Jun. 15, 2017

Related U.S. Application Data

(60) Provisional application No. 62/266,756, filed on Dec. 14, 2015.

(51) Int. Cl.
*G06F 8/71* (2018.01)
*G06Q 10/06* (2012.01)
(52) U.S. Cl.
CPC .......... *G06Q 10/0635* (2013.01); *G06F 8/71* (2013.01); *G06Q 10/06395* (2013.01); *Y04S 10/54* (2013.01)
(58) Field of Classification Search
CPC ................................................ G06Q 10/0635
(Continued)

(56) References Cited

U.S. PATENT DOCUMENTS 7,131,112 B1 * 10/2006 Bartz ........................ G06F 8/71
717/122
9,158,658 B2 * 10/2015 Bigwood ............ G06F 11/3624
(Continued)

OTHER PUBLICATIONS

P. Behnamghader, R. Alfayez, K. Srisopha and B. Boehm, "Towards Better Understanding of Software Quality Evolution through Commit-Impact Analysis," 2017 IEEE International Conference on Software Quality, Reliability and Security (QRS), Prague, 2017, pp. 251-262. (Year: 2017).*
(Continued)

*Primary Examiner* — James D. Rutten
(74) *Attorney, Agent, or Firm* — Knobbe, Martens, Olson & Bear, LLP

(57) ABSTRACT

Described are various embodiments of a continuous integration software development platform and system, and implementation method therefor. In one embodiment, the process comprises creating at least one regular changeset bundle from said submitted software changesets; executing a predefined automated pre-commit quality verification on said at least one regular changeset bundle; promoting at least some successfully verified software changesets in said at least one regular changeset bundle as confirmed low-risk changesets; creating a primary bundle from said confirmed low-risk changesets; executing said pre-commit quality verification on said primary bundle against a current software development version label; and committing at least some successfully verified low-risk changesets in said primary bundle to invoke a new software development version label to be set as said current software development version label in subsequent primary bundle verifications.

12 Claims, 10 Drawing Sheets

(58) Field of Classification Search
USPC .......................................................... 717/102
See application file for complete search history.

(56) References Cited

U.S. PATENT DOCUMENTS

| 9,921,948 B2* | 3/2018 | Zieder ........................ G06F 8/60 |
| 2013/0036400 A1* | 2/2013 | Bak ........................... G06F 8/71 |
| | | 717/101 |
| 2015/0067647 A1* | 3/2015 | Bakowski ............. G06F 11/368 |
| | | 717/124 |
| 2017/0091072 A1* | 3/2017 | Atyam ................ G06F 11/3616 |

OTHER PUBLICATIONS

Mithun Acharya and Brian Robinson. 2011. Practical change impact analysis based on static program slicing for industrial software systems. In Proceedings of the 33rd International Conference on Software Engineering (ICSE '11). ACM, New York, NY, USA, 746-755 (Year: 2011).*

* cited by examiner

CONTINUOUS INTEGRATION SOFTWARE DEVELOPMENT PLATFORM AND SYSTEM, AND IMPLEMENTATION METHOD THEREFOR

CROSS REFERENCE TO RELATED APPLICATION

This application claims the benefit of U.S. Provisional Patent Application No. 62/266,756, filed Dec. 14, 2015, which is hereby incorporated herein by reference.

FIELD OF THE DISCLOSURE

The present disclosure relates to software development systems and methods, and, in particular, to a continuous integration software development platform and system, and implementation method therefor.

BACKGROUND

In traditional continuous integration systems, contributors typically pull a recent (preferably latest) stable project version into a private workspace, develop their changesets, perform a set of mandatory pre-commit quality verifications (build, unit test, static analysis, etc.), update their workspace to the now latest project version thus integrating (merging) their changeset with other changesets committed on the project branch after the stable project version used in their workspace, eventually repeat the pre-commit quality verifications depending on the complexity and risk of the update to the latest project version and finally commit the code to the branch thus creating a new latest project version. Periodically (or even after every commit), automated tasks perform a set of integration quality verifications on the latest or a recent project version to detect regressions in the software quality.

Occasionally the detected quality regressions are catastrophic in the sense that they are build or test failures which would prevent some or all branch contributors with workspaces based on the respective project version from successfully passing the set of mandatory pre-commit quality verifications and thus from committing their changesets. The project versions affected by such quality regressions are considered unstable. Quality regressions causing unstable project versions need to be addressed for the project as a whole to move forward and are therefore considered blocking regressions.

Addressing blocking regressions are not time-bound, typically because they may require human intervention for investigation and/or fixing, or because multiple simultaneous quality regressions may mask each other necessitating multiple sequential iterations until stability is achieved.

Changesets causing blocking regressions fall into two categories: faulty changesets which cause quality regressions by themselves, and conflicting changesets which by themselves don't cause quality regressions but do so when integrated together.

The probability of blocking regressions caused by faulty changesets increases with the increase of the project branch commit rate. The probability of blocking regressions caused by conflicting changesets increases with the number of outstanding individual changesets which are committed after the stable branch label used in the individual contributor workflows and which are thus not included in the workflow quality verification context. The number of these outstanding changesets increases with the number of unstable labels, the time required to address the blocking regressions causing the instabilities, and with the project branch commit rate.

Eventually, as the branch commit rate increases, the probability of obtaining stable labels decreases until it eventually reaches insignificant levels, effectively bringing the project to a halt. The limited achievable branch commit rate makes traditional continuous integration systems unattractive for larger scale projects.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a continuous integration software development platform and system that overcome some of the drawbacks of known techniques, or at least, provides a useful alternative thereto. Some aspects of this disclosure provide examples of such platforms and systems. In some such examples, the platform and system can process integration of a multitude of software changes from multiple contributors into a single branch of a version control system ("VCS") in which a software project is maintained, using a continuous integration (CI) practice as described herein.

In accordance with one aspect, there is provided a method for automatically verifying submitted software changes in a continuous integration software development process, comprising: receiving a plurality of submitted software changesets; creating at least one regular changeset bundle from said submitted software changesets; executing a predefined automated pre-commit quality verification on said at least one regular changeset bundle; promoting at least some successfully verified software changesets in said at least one regular changeset bundle as confirmed low-risk changesets; creating a primary bundle from said confirmed low-risk changesets; executing said pre-commit quality verification on said primary bundle against a current software development version label; and committing at least some successfully verified low-risk changesets in said primary bundle to invoke a new software development version label to be set as said current software development version label in subsequent primary bundle verifications.

In accordance with one embodiment, the plurality of said regular changeset bundles are formed and verified in parallel to concurrently populate a low-risk changeset pool with said confirmed low-risk changesets; and wherein a single said primary bundle is created at any one time from said low-risk changeset pool.

In accordance with one embodiment, said primary bundle is serially created and committed.

In accordance with one embodiment, the method further comprises, after said receiving: creating at least one preliminary changeset bundle from said submitted software changesets; executing one or more predefined automated preliminary quality verifications on said at least one preliminary changeset bundle; and promoting at least some successfully preliminarily verified software changesets in said at least one preliminary changeset bundle to a pre-commit changeset pool, wherein said at least one regular changeset bundle is created from said pre-commit changeset pool.

In accordance with one embodiment, the method further comprises, after said receiving: sequentially verifying said submitted software changesets across multiple preliminary verification stages, each one of which comprising: creating at least one preliminary changeset bundle; executing a predefined automated preliminary quality verification on said at least one preliminary changeset bundle; promoting successfully verified changesets in said at least one preliminary changeset bundle to a subsequent preliminary verification stage; and populating a pre-commit regular changeset pool with changesets having been successfully sequentially verified across all of said multiple preliminary verification stages, from which to create said at least one regular changeset bundle.

In accordance with one embodiment, said predefined automated pre-commit quality verification includes each said predefined automated preliminary quality verification.

In accordance with one embodiment, the method further comprises: isolating a blocking changeset as causing any said preliminary changeset bundle to fail any of said one or more predefined automated preliminary quality verifications; and rejecting said blocking changeset.

In accordance with one embodiment, the method further comprises: isolating a blocking changeset as causing any said preliminary changeset bundle to fail any said predefined automated preliminary quality verification; and rejecting said blocking changeset.

In accordance with one embodiment, the method further comprises: isolating a blocking changeset as causing any one of said regular bundles and said primary bundle to fail said pre-commit verification; and rejecting said blocking changeset pre-committal.

In accordance with one embodiment, the method further comprises executing a post-commit verification on said new software development version label.

In accordance with another aspect, there is provided a continuous integration software development system comprising: a developer network interface communicatively linked to a developer network to receive a plurality of submitted software changesets therefrom; a database storing each of said submitted changesets in association with one of a regular changeset pool and a low-risk changeset pool; and a continuous integration controller operatively linked to said database to: create at least one regular changeset bundle from said submitted software changesets currently associated with said regular changeset pool; execute a predefined automated pre-commit quality verification on said at least one regular changeset bundle; promote at least some successfully verified software changesets in said at least one regular changeset bundle to said low-risk changeset pool; create a primary bundle from said low-risk changeset pool; execute said pre-commit quality verification on said primary bundle against a current software development version label; and commit at least some successfully verified low-risk changesets in said primary bundle to invoke a new software development version label to be set as said current software development version label in subsequent primary bundle verifications.

In accordance with one embodiment, the continuous integration controller is further operable to execute a preliminary verification process as defined above.

In accordance with another aspect, there is provided a non-transitory computer-readable medium having statements and instructions stored thereon to be executed by a digital processor to automatically verify submitted software changes in a continuous integration software development process by automatically executing a verification process as defined above.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Figure 1:
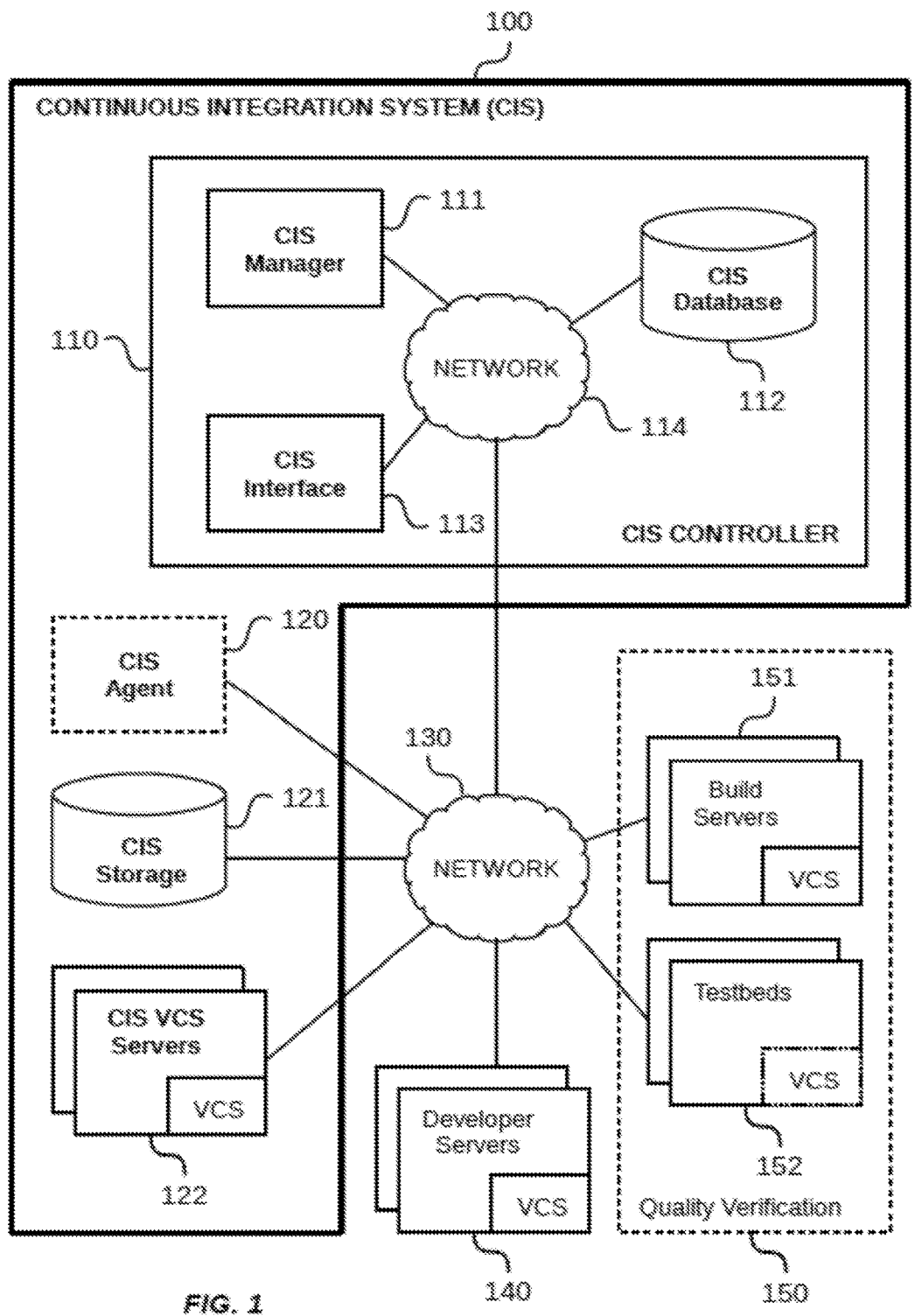
FIG. 1 is a network diagram of an exemplary continuous integration system to orchestrate integration of candidate software changes submitted by developers into a software project integration branch, in accordance with one embodiment.

The systems and methods described herein provide, in accordance with different embodiments, different examples of a continuous integration system (CIS) exhibiting significant reductions in manifested blocking regressions due to the implementation of a robust pre-commit quality verification protocol that detects and rejects candidate software changes that may cause such blocking regressions before such changes are committed to a given software development branch.

In some embodiments, a combination of one or more techniques can be used to achieve such non-blocking characteristics while sustaining relatively high average branch commit rates. Some of these techniques, as will be described in greater detail below, include effective changeset bundling and bundle-specific verification protocols.

For example, in some embodiments, multiple non-overlapping candidate software changes may be bundled for simultaneous quality verification. The CIS may then automatically identify and reject each individual candidate software change within a given bundle causing a blocking regression by executing an automated bundle searching process that invokes a finite sequence of bundle splits to efficiently narrow down the search within this given bundle without compromising/delaying otherwise valid changes.

To accelerate changeset verifications, some embodiments of the CIS may invoke parallel bundle quality verifications in a pre-commit verification stage, and optionally in one or more preliminary verification stages, so to simultaneously search for multiple candidate software changes causing blocking regressions. As a result, faulty and/or conflicting changesets can be efficiently identified and rejected in this(ese) stage(s) before being committed.

Final pre-commit quality verifications of various bundles containing multiple candidate software changes can also be serialized to ensure that each and every change is committed only after successful pre-commit quality verification together with all the other changesets committed before it, whereas all remaining conflicting changesets can be rejected at this stage without ever being committed to the branch.

As will be detailed below, the above and below detailed approaches to continuous changeset verification and integration can enable and optimize non-blocking operation of integration branch activities by significantly reducing or even altogether preventing blocking regressions in the branch quality level. For instance, the serialized pre-commit verifications on primary changeset bundles can reduce or altogether prevent regressions by accurately and efficiently identifying both faulty changesets and conflicting changesets in automated pre-commit quality verifications. Namely, while parallel regular bundle verification and committal could expedite processing, some risk persists in such a configuration that conflicting changesets could exist in distinct bundles that are being processed in parallel and thus concurrently committed to generate a blocking regression in the newly created branch label. That being said, the parallel pre-commit verification of regular bundles may nonetheless expedite the process by promoting verified regular bundle changesets to a low-risk changeset pool used to feed the creation of larger primary bundles at lower regression risk and thus maintain higher average committal rates despite the serial nature of the primary bundle committal process.

As noted above, successful quality verification of multiple changesets within a given bundle can validate all changesets in this bundle simultaneously, contributing to the overall performance of the CIS, which may be defined by lower verification costs, shorter per-changeset average processing times, higher commit rates, etc. Accordingly, by increasing bundle sizes, overall CIS performance gains can be achieved. To do so, in some embodiments, two or more changeset pools with progressively decreasing risk can thus be pipelined to allow for progressively higher bundle sizes, thus further accentuating changeset bundling advantages.

Performance can be further enhanced by scaling the CIS, for example: by adding quality verification resources (scaling out) to increase the number of bundles that can be verified simultaneously; upgrading the quality verification resources (scaling up) to reduce bundle verification times; and/or by adding preliminary verification stages to promote increasingly higher bundle sizes.

The person of ordinary skill in the art will appreciate that these and other such performance enhancements can, alone or in combination, further translate into higher achievable changeset commit rates, and thus, further validate the use of these approaches over conventional systems.

With reference now to FIG. 1, and in accordance with one embodiment, a continuous integration system ("CIS") 100, will now be described. As noted above, the CIS as schematically illustrated in FIG. 1 orchestrates the integration of candidate software changes submitted by developers into a project integration branch in a manner that reduces if not altogether prevents blockages caused by unacceptable regressions in the product quality levels, while sustaining acceptable if not relatively high average branch commit rates.

In the illustrated embodiment of FIG. 1, a CIS Controller 110 is responsible for driving the operation of the CIS 100, and illustratively comprises a CIS Manger 111 application, a CIS Database 112 application and a CIS Interface 113 application, all communicatively linked via a communication network 114 or the like.

In one embodiment, the CIS Controller 110 is implemented as a cloud-based platform-as-a-service ("PaaS") application, wherein some or all of its components are executed as cloud-based services offered by a CIS PaaS provider. Alternatively, some or all of the CIS Controller components may be executed as traditional standalone applications. In yet other embodiments, the CIS Controller may be executed as an internal controller, for example, within the context of an integrated in-house software development platform or system. Other networked, distributed and/or integrated system architectures may be also be considered within the scope of the present disclosure, as will be apparent to the skilled artisan.

In the illustrated embodiment, the CIS Manager 111 application implements the operational logic of the CIS 100, again either as a component of a CIS Controller PaaS application or as a standalone traditional application executed on a centralized or distributed physical or virtualized computing platform, In the illustrated embodiment, the CIS Database 112 application is used for storing configuration and operational data related to the operation of the CIS, which may include, but is not limited to:

changesets representing candidate software changes to be integrated in a given software project branch;

changeset pools representing various stages of a CIS processing pipeline in which changesets accumulate;

bundles of changesets respectively bundled for simultaneous quality verifications;

bundle pools representing various stages of the CIS processing pipeline in which bundles accumulate;

a version control system (VCS) configuration containing information necessary for interfacing with a specific VCS used for managing the software project;

one or more quality verification configurations containing information required by the CIS to perform software quality verifications on quality verification resources 150;

events received or generated during the operation of the CIS;

configurations for event notifications which the CIS Manager 111 can initiate in response to certain events, such as, but not limited to: event types, notification types to be used, recipient list, rate limits, etc.;

configurations for various types of statistical analysis that the CIS Manager 111 can perform on changesets, bundles and events to generate trends and derived events used for monitoring the operation of the CIS;

statistical data derived from other data stored in the CIS Database;

logs generated during operation of the CIS; and configurations for policies that the CIS Manager 111 can use to perform automated archiving, retention and deletion of operational data and logs, used for the maintenance of the CIS.

As noted above, the CIS Database 112 application can be implemented as a PaaS storage service component of a CIS Controller PaaS application, or as a standalone application implemented on a centralized or distributed traditional database system, for example.

Figure 2:
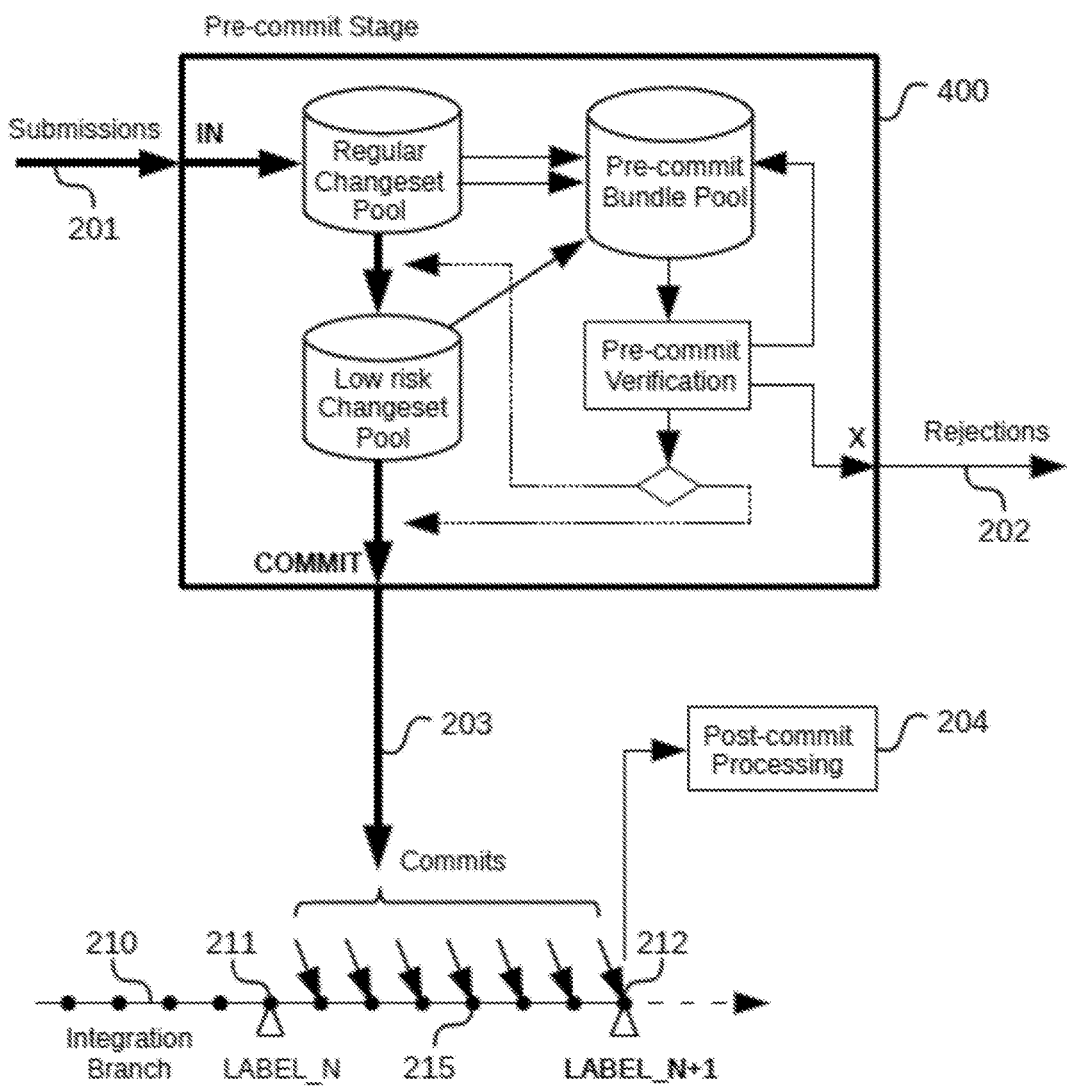
FIG. 2 is a logical operational flow diagram of the continuous integration system of FIG. 1, in accordance with one embodiment.
Figure 10:
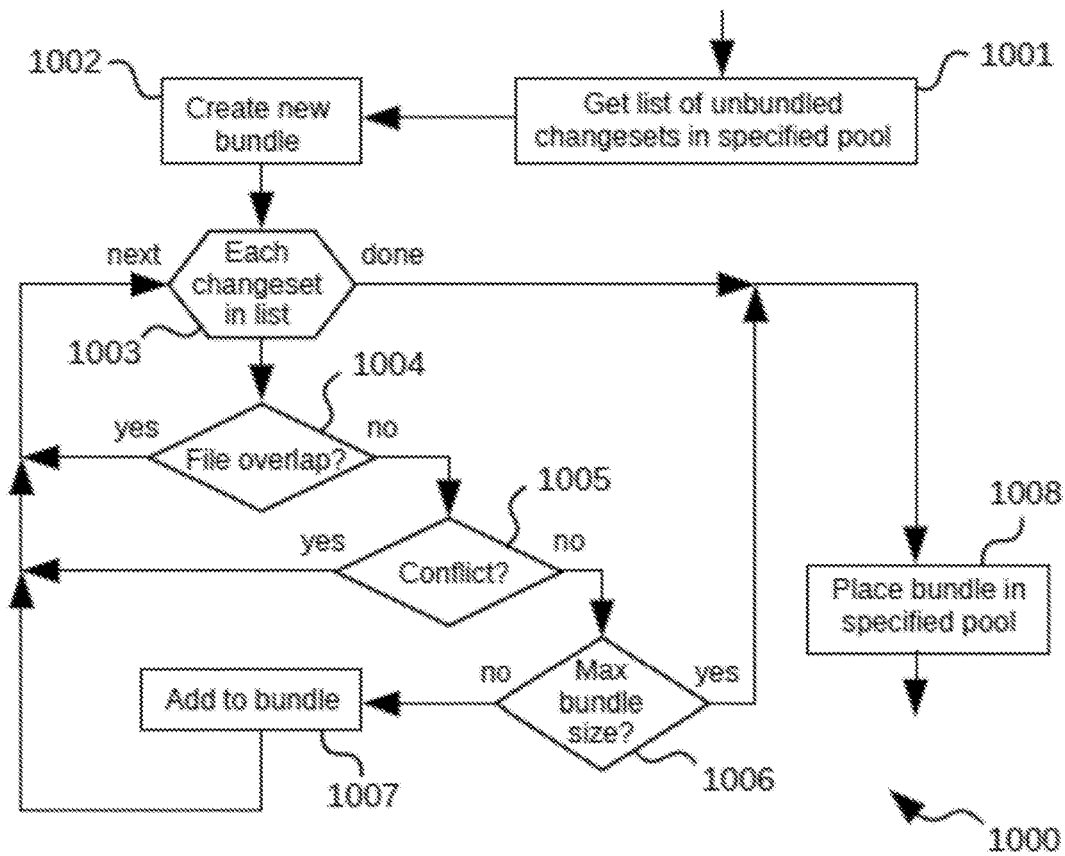
FIG. 10 is a logical diagram of an automated process for creating a bundle of a specified type from a pool of changesets, in accordance with one embodiment.
Figure 11:
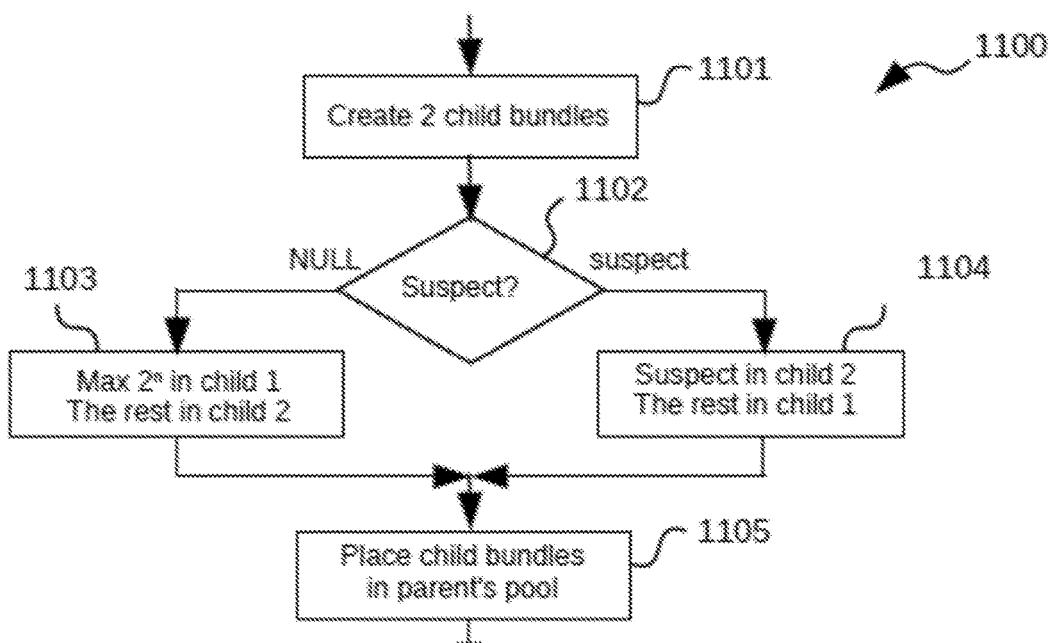
FIG. 11 is a logical diagram of an automated process for splitting a bundle upon detection of a regression in a quality verification output result, in accordance with one embodiment.
Figure 14:
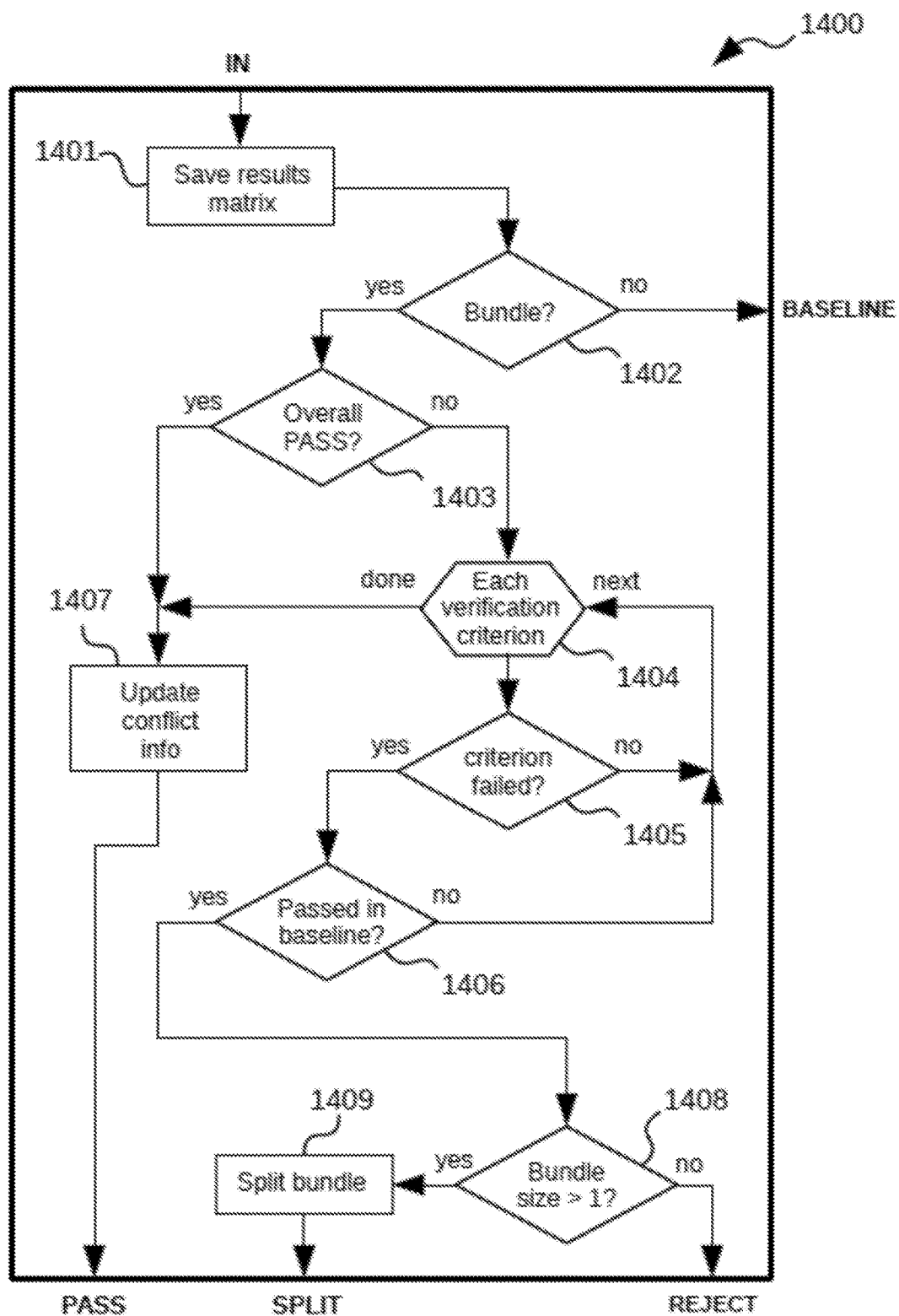
FIG. 14 is a logical internal operation flow diagram of a verification result analysis block, in accordance with one embodiment.

In present example, changesets are defined as representations in the CIS Database of software changes submitted by respective developers for integration into a given software project branch, and may be characterized by one or more of the following non-limiting listing of data fields or attributes comprising:

a unique changeset ID identifying the changeset in the CIS;

a submitter ID identifying the developer who submitted the software changes;

a changeset submission timestamp used, for example, in the bundling process 1000 illustrated in FIG. 10 and/or for monitoring and tuning the CIS;

a changeset status reflecting the changeset's overall progress in the processing pipeline of the CIS;

a list of the VCS-controlled software artifacts (files, directories, metadata, etc.) modified, added, deleted, renamed or otherwise touched by the changeset, used for example in the bundling process 1000 illustrated in FIG. 10 and further in the test 1102 of the bundle splitting process 1100 illustrated in FIG. 11;

a unique VCS opaque data blob ID identifying a changeset's VCS-specific opaque data blob stored on a CIS shared storage 121, for example; and a list of potentially conflicting changesets, updated for example in step 1407 of the verification result analysis block 1400 illustrated in FIG. 14 and in the post-commit processing 204 of the CIS as shown in FIG. 2, and used for example in the test 1005 of the bundling process 1000 illustrated in FIG. 10.

Likewise, changeset pools are defined as representations in the CIS Database of specific points in the processing pipeline of the CIS that changesets can reach, and are generally characterized in one exemplary embodiment by a respective lists of changeset IDs. Generally, a particular changeset cannot be present in more than one changeset pool at any one time.

Figure 4:
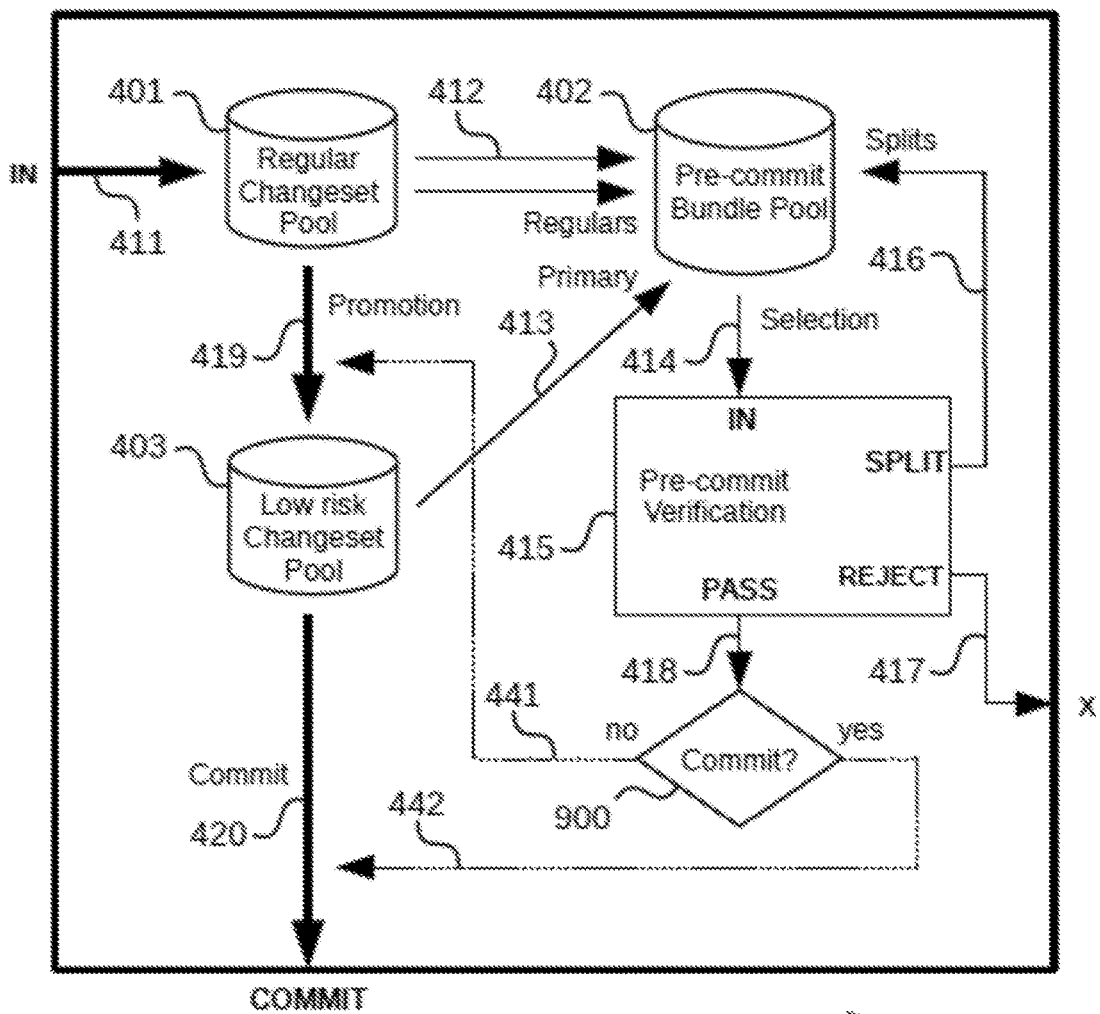
FIG. 4 is a logical internal operation flow diagram of a pre-commit verification stage, in accordance with one embodiment.

In one embodiment, bundles are defined as representations in the CIS Database of groups of changesets bundled together for simultaneous quality verifications in the processing pipeline of the CIS, and may be characterized by one or more of the following non-limiting listing of data fields or attributes comprising:

a unique bundle ID identifying the bundle in the CIS;

a bundle creation timestamp, for example used for monitoring and tuning the CIS;

a bundle status, for example reflecting the bundle's overall progress in the processing pipeline of the CIS;

a bundle size, for example representing a number of changesets in the bundle;

a list of bundled changeset IDs;

a low risk flag, for example indicating if the bundle contains changesets from the low risk changeset pool (see pool 403 of FIG. 4);

a bundle level, for example reflecting a bundle's ancestry level, which may in one example be set to 1 by the bundling process 1000 illustrated in FIG. 10 or set by the bundle split process 1100 illustrated in FIG. 11 to be equal to a parent bundle's level+1 for child bundles;

a pair of child bundle IDs, for example set for parent bundles split by the bundle split process noted above;

a parent bundle ID, for example set for child bundles created by the bundle split process noted above when splitting a parent bundle; and a peer bundle ID, for example set for child bundles created by the bundle split process noted above, wherein each of the two child bundles resulting from splitting a same parent bundle is the other child bundle's peer.

In one embodiment, bundle pools are defined as representations in the CIS Database of specific points in the processing pipeline of the CIS in which bundles of changesets reside while waiting for and during quality verifications, and generally consist of respective lists of bundle IDs. In one example, a particular bundle will remain in the bundle pool in which it was placed at creation time until its processing completes.

In one embodiment, events stored in the CIS Database may contain one or more of the following non-limiting list of attributes:

a unique event identifier;

a timestamp, for example used for identifying a moment in time when the event occurred;

an event context, for example identifying other elements in the CIS Database related to the event, like a particular changeset or bundle, for example; and an event type, for example used for filtering event queries and to indicate the type of information the event context points to.

Periodically, or when certain types of events are detected or generated, the CIS Manager can be configured to perform various types of statistical analysis on various data from the CIS Database to obtain trending information and generate derived events. Such trending information and derived events can be used in planning, performance improvement, monitoring and maintaining the operation of the CIS, detection of outages or intermittent issues in the supporting infrastructure, detection of intermittent issues in the software being integrated, etc.

The CIS Interface 113 is an application allowing end-users to access the CIS Manager and the CIS Database for configuration, control, monitoring and reporting of the CIS operation. Again, the CIS Interface can be implemented as a PaaS web service component of a CIS Controller PaaS application, or as a standalone application on a traditional centralized or distributed web service system, for example. In some embodiments, total or partial access to the facilities offered by the CIS Interface can be restricted to specific users or roles of specific users based on user authentication. User roles may include, but are not limited to: developers, for example focused on the particular changesets they submit; managers, for example focused on overall software project integration; and administrators, for example focused on the configuration and maintenance of the CIS itself.

In some embodiments, the control functionality offered by the CIS Interface may include, but is not limited to, the following non-limiting list of operations:

- activating CIS operation on a particular software project branch, either for the first time, or again after executing direct commits to the branch or after merging other project branches into it, in each case invoking the establishment of a new project baseline quality level for use in subsequent bundle verification processes;
- temporarily suspending CIS operation on a particular software project branch, for example during planned maintenance windows or when unplanned infrastructure outages affect CIS functionality;
- stopping CIS operation on a particular software project branch, for example once this branch reaches its end of life, or again after executing direct commits to the branch or after merging other project branches into it;
- changeset cancellation, for example executed when a particular changeset requires additional modifications or is no longer applicable, or again to terminate an in-progress automated search to identify a blocking changeset causing a particular blocking regression detected for a particular bundle where the blocking changeset is otherwise manually identified as the cause of the regression and marked for cancellation;
- manual suspect changeset flagging executed when a given changeset is manually identified as being suspected of causing a particular blocking regression for a given bundle; and
- manual retry of a bundle quality verification failed, for example, due to reasons unrelated to any of the changesets contained in the bundle, such as unplanned outages in the CIS supporting infrastructure.

In some embodiments, a wide variety of informational data can likewise be offered by the CIS Interface in various views and formats for monitoring and reporting purposes, such as, but not limited to:

- specific information about particular changesets or bundles, like status, content, details, progress in the CIS processing pipeline, associated events, etc.;
- reports based on various queries on the CIS Database, in spreadsheets, tables, graphs, charts, etc., viewable or downloadable in various popular or customized formats;
- various alarm indicators for derived events generated by statistical analysis of operational data from the CIS Database collected during operation of the CIS;
- fixed or customizable dashboards, for either general, per-user or per-user-type use; and
- notifications for various types of events and in various formats, like email, SMS, XMPP, tweets, etc.

In some embodiments, the CIS Interface can also offer REST APIs providing programmatic access to the CIS Database or other access APIs which can be used by custom network, server, desktop or mobile applications extending the functionality or usability of the CIS Interface or the CIS as a whole.

In the illustrated embodiment, the CIS 100 has access to the project's software development environment in which the software development project activities are performed. As such, the software development network 130 will generally connect:

- the components of the CIS present in the software development environment, e.g. a CIS Agent 120 application, a CIS Storage 121 application and one or more CIS VCS servers 122;
- one or more developer servers 140 on which software changes can be developed and submitted to the CIS for integration into the software project integration branch;
- one or more quality verification resources 150 on which the project's software, with or without additional candidate software changes to be integrated into the project's integration branch, can be subjected to quality verifications by the CIS; and
- the version control system ("VCS"), used by the software project branch on which the CIS operates, and which has a distributed presence on all the servers and resources connected to the software development network.

The software development network 130 can be a public network (for example the internet for open-source projects hosted in the cloud) or a private/corporate network. Depending on the particularities of the software project on which the CIS operates, the CIS controller network 114 may, but not need be, a different network than the software development network 130. In any event, the CIS controller network 114 will generally be accessible from the software development network 130.

In the illustrated embodiment, the CIS Agent 120 application, stored on the CIS Storage 121, acts as a communication proxy for, and a representative of the CIS Controller 110 in the software development environment. The CIS Agent also isolates the CIS Controller from all the particularities of the project's VCS and of the project's quality verification operations. The CIS Agent 120 can be implemented as one or more applications, which can be running on dedicated or shared computing servers, physical or virtualized.

In one embodiment, the CIS storage 121 may comprise a shared network storage, like NFS for example, and eventually be combined with a centralized or distributed traditional database system. The CIS storage may be used, for example, to store:

- a CIS submission application used on developer servers 140 for submission of candidate software changes to the CIS 100 for integration into the software project integration branch;
- the VCS configuration mirrored from the CIS Database 112 for local access on the developer network 130;
- a VCS wrapper application used, for example, by the CIS to perform VCS-specific operations on the various servers connected to the developer network 130;
- the VCS-specific opaque data blobs of the candidate changesets submitted for integration;
- logs and artifacts that may be produced by the executions of the VCS wrapper application;
- the quality verification configurations mirrored from the CIS Database for local access on the developer network 130, which can be used for example by the CIS to perform software quality verifications on the quality verification resources 150;
- a set of quality verification wrapper applications, i.e. one for each type of quality verification steps present in the quality verification configurations for the software project branch, which can be used to by the CIS to perform software quality verifications on the quality verification resources 150;

artifacts that may be produced by and/or that are required for the executions of the quality verification wrapper applications; and logs that may be produced by executions of the quality verification wrapper applications.

In the illustrated embodiment, CIS VCS servers 122 are connected to the developer network 130 and used by the CIS to perform VCS-related operations, which may include, but are not limited to automatic commits of candidate software changes into the project's branch. Again, these may be dedicated or shared computing servers, physical or virtualized.

In some embodiments, a complexity of a given software project amenable to the CIS described herein may vary from a single VCS repository, to a combination of flat or nested sets of VCS repositories potentially using different source or VCS types (e.g. GIT, Clearcase, SVN, etc.) managed together in a monolithic manner. To accommodate such variety of underlying VCS infrastructure, the CIS in some embodiments may be configured to use a generic VCS API for performing, for example, one or more of the following non-limiting list of generic VCS operations:

create a changeset's VCS opaque data blob from a workspace;

provide generic changeset information from the changeset's opaque blob data (for example the list of directories and files touched by the changeset);

create a workspace based on a specific project version;

patch a list of one or more non-overlapping changeset opaque blob data into a workspace;

commit a changeset from a workspace in which its opaque data blob was patched; and apply a specified label on a latest project version.

In some embodiments, the VCS wrapper application implementing the generic VCS operations from the generic VCS API for the project's specific VCS particularities is stored on the CIS storage 121. The VCS wrapper application is invoked by the CIS Agent 120 to perform the VCS API operations on behalf of the CIS Controller 110.

In general, a changeset's VCS opaque data blob will include all necessary information reflecting the candidate software changes (for example diffs, binary files, metadata, commit comments, issue ID) required by the VCS wrapper application to perform the changeset-related generic VCS API operations in the project's specific VCS. In such embodiments, the CIS thus will not directly access the data in a changeset's blob, but will rather reference the blob's ID when invoking the VCS wrapper application to perform changeset-related VCS API operations.

In some embodiments, a VCS wrapper start event can be recorded in the CIS database 112 when the VCS wrapper is invoked, containing the invocation context info (for example the server and filesystem path where the invocation occurs). When the execution completes, the log produced by the VCS wrapper can be stored on the CIS Storage 121 and a VCS wrapper completion event can be recorded in the CIS database 112, with context information containing a reference to the corresponding VCS wrapper start event and the identifier of the log in the CIS Storage. Generally, such information will only be used for reference or reporting purposes.

Generally, no direct commit of software changes to any of the project repositories will be permissible during operation of the CIS. Rather, all candidate software changes should be processed through the CIS, which automatically commits those changes verified to not cause blocking quality regressions. A strict policy enforcing this practice should thus be in place. Many types of VCS support enforcement of such policies using automated mechanisms such as commit triggers or hooks, and often, large projects will already have such commit policy enforcement mechanisms in place, which may be configured or updated to address this particular policy when migrating to a CIS as described herein.

In the illustrated embodiment, the developer servers 140 are servers in the software development environment from which developers submit candidate software changes to the CIS for integration into the software project integration branch. Developers will generally invoke the CIS submission application stored on the CIS storage 121. The CIS submission application will then invoke the VCS wrapper application to create the VCS opaque data blob representing the candidate software changes, store the VCS opaque data blob on the CIS shared storage 121 identifiable using a unique VCS opaque data blob ID, and inform the CIS Agent 120. The CIS Agent then informs the CIS Manager which creates a changeset in the CIS Database and places it into a changeset pool.

In the illustrated embodiment, the quality verification resources 150 can include build servers 151 and testbeds 152, for example, located in the software development environment, representing one or more identical instances of the various different types of quality verification resources that may be necessary for the various kinds of software quality verifications the project may require (e.g. different kinds of builds, tests, code analysis, etc.)

With reference now to FIG. 2, and in accordance with one embodiment, a logical operational flow of the CIS 100 of FIG. 1 will now be described. In this embodiment, changeset submission events 201 represent submissions of candidate software changes to the CIS. Developers can submit candidate software changes to the CIS from development servers 140 by invoking a CIS submission application located on the CIS storage 121, for example.

For each candidate software change, the CIS submission application stores the VCS opaque data blob representing the software changes on the CIS storage and informs the CIS Agent 120. The CIS Agent informs the CIS Manager 111, which creates the changeset in the CIS Database 112 and passes it to the input port IN of the pre-commit verification stage 400, which is further detailed in FIG. 4 in accordance with one exemplary embodiment.

Generally, the pre-commit verification stage 400 groups multiple non-overlapping changesets in bundles, performs a pre-commit quality verification process on these bundles and identifies any changesets causing blocking regressions.

Rejection events 202 are triggered when individual changesets identified to be causing blocking regressions are produced at the output port X of the pre-commit verification stage 400. The CIS Controller 110 then removes the rejected changesets from their corresponding changeset pool(s), sets their state to REJECTED and informs their (respective) submitter(s) to re-evaluate their submitted software changes.

On the other hand, commit events 203 are triggered when bundles of committable changesets are produced at the output port COMMIT of the pre-commit verification stage 400. The CIS Manager 111 instructs the CIS Agent 120 to commit each and every individual changeset in the committable bundle to the software project's integration branch 210, and then to apply the LABEL_N+1 stable label 212 on the software version now encompassing each of the committable bundle's committed changesets.

The CIS Manager 111 then updates the project's baseline label to the newly applied stable label 212 in the CIS Database 112.

Generally, each committable bundle will be verified to not cause a blocking regression in the pre-commit verification stage using the project's current baseline label. For the commit event 203 shown in FIG. 2 and introduced above, the baseline label was set as the LABEL_N stable label 211. Upon committing the committable bundle referenced by event 203, the current project baseline label is updated to the newly applied LABEL_N+1 label 212, which is guaranteed to be stable and will thus be used in the subsequent pre-commit quality verification of the next committable bundle. This serialized pre-commit quality verification for the committable bundles ensures the branch is not affected by blocking regressions caused by conflicting changesets verified in different bundles in parallel. Any project version 215 between the previous project baseline label 211 and the new project baseline label 212 will not, however, be guaranteed to be stable as it was not generally verified against other intervening versions 215. Accordingly, while some intervening changeset committals may be permitted in some embodiments to effectively bypass the CIS processes described herein, these may increase the risk of blocking regressions, whereby only those specifically labeled by the CIS (211, 212) can be guaranteed to be stable.

In the illustrated embodiment of FIG. 2, post-commit processing 204 is executed after the project's baseline label is updated to the newly applied stable label 212, which may include, but is not limited to:

the changeset IDs from the changeset ID list of the committed bundle are removed from a list of potentially conflicting changesets of all changesets present in all changeset pools of the CIS;

the backup bundle, if present, is dropped;

optional external trigger events can be generated by the CIS Manager 111, and eventually replicated by the CIS Agent 120 into the software development network 130, which can be used to signal to other external processes the availability of the new stable label 212, e.g. for manual software quality verifications, software deployments, etc.; and optional triggering of an execution of a post-commit quality verification in a verification block configured to execute a post-commit quality verification set.

In one embodiment, an optional post-commit quality verification stage as noted above can contain verification steps that are too lengthy, don't have enough quality verification resources or are not mature enough or stable enough to be executed in the pre-commit verification, for example, and thus get migrated to a post-commit verification stage. In such embodiments, the operation of a post-commit verification block is exclusively in a VCS label context, i.e. there are no changesets or bundles to handle. The execution of the post-commit quality verification happens in the background, the rest of the continuous system operation continuing without any regards to the post-commit verification status or progress. The results of the post-commit verification are used for informational purposes only, i.e. to monitor the respective verification quality levels, without any promise of stability, just like in traditional continuous integration systems. A typical usage of a post-commit verification stage is developing, testing and capacity planning of quality verification steps prior to deployment in the pre-commit verification stage, for example.

Figure 3:
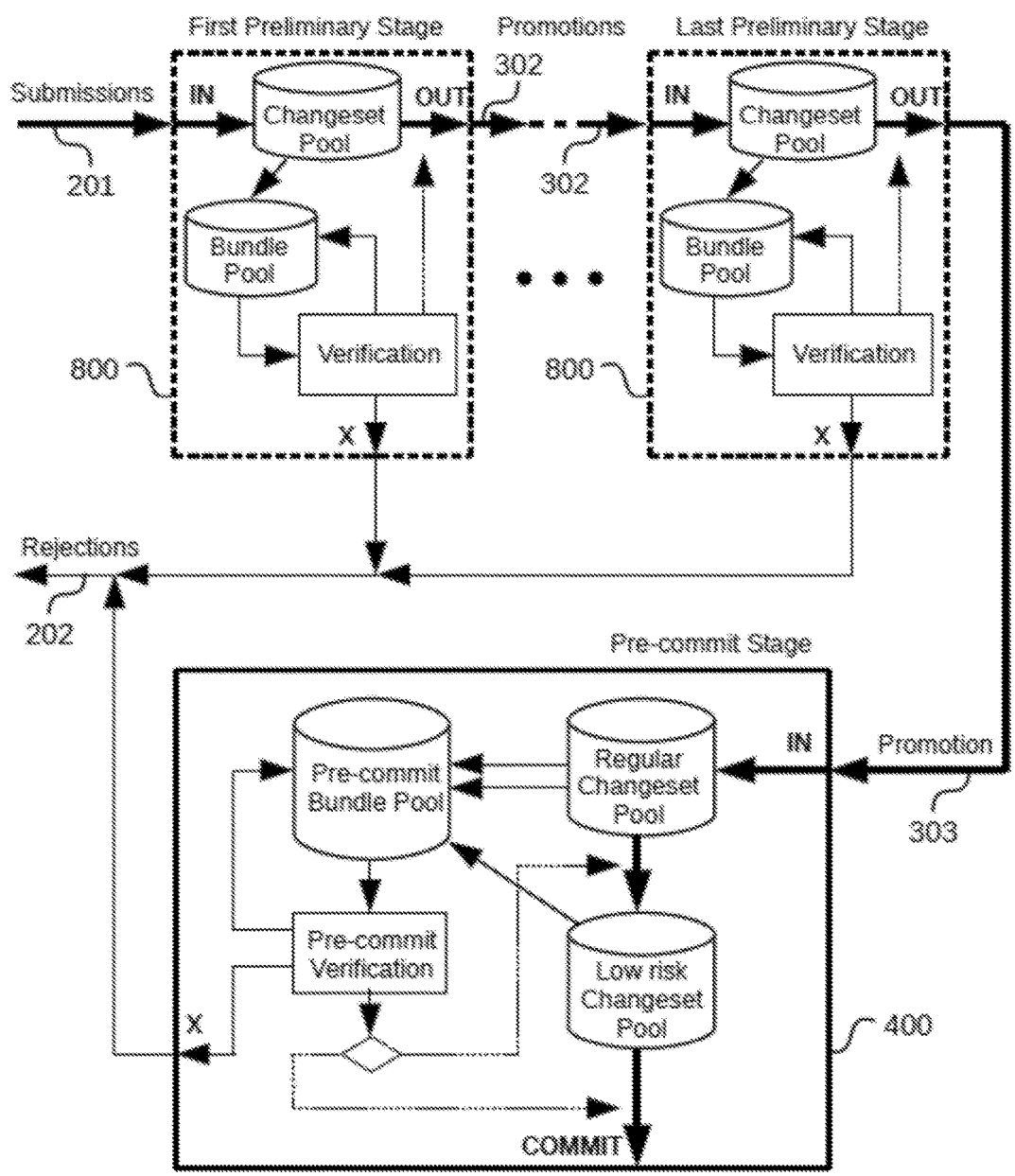
FIG. 3 is a logical operation flow diagram of the continuous integration system of FIG. 1, in accordance with another embodiment modified to provide an optional preliminary verification chain preceding a pre-commit verification stage.

With reference to FIG. 4, an exemplary logical internal operational flow of the pre-commit verification stage 400 will now be described, in accordance with one embodiment. In this example, incoming events 411 occur when changesets are passed to the input port IN of the pre-commit verification stage 400 either directly by corresponding submission events 201 (as shown in FIG. 2) or by promotion events 303 from the last preliminary verification stage 800 in a preliminary verification chain (as shown in FIG. 3. The incoming changesets 411 are placed into a regular changeset pool 401.

Regular bundle creation events 412, primary bundle creation events 413 and bundle selection events 414 can be triggered from a pre-commit bundle selection process, schematically illustrated as process 500 in FIG. 5 (described below), which may be invoked to select bundles from a pre-commit bundle pool 402 for processing in a pre-commit verification block 415.

Figure 5:
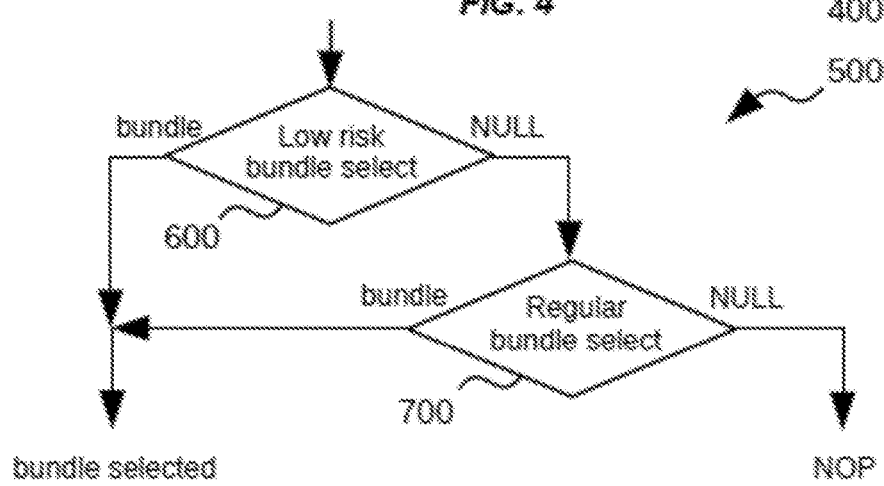
FIG. 5 is a logical diagram of an automated process for selecting bundles for pre-commit quality verifications, in accordance with one embodiment.
Figure 7:
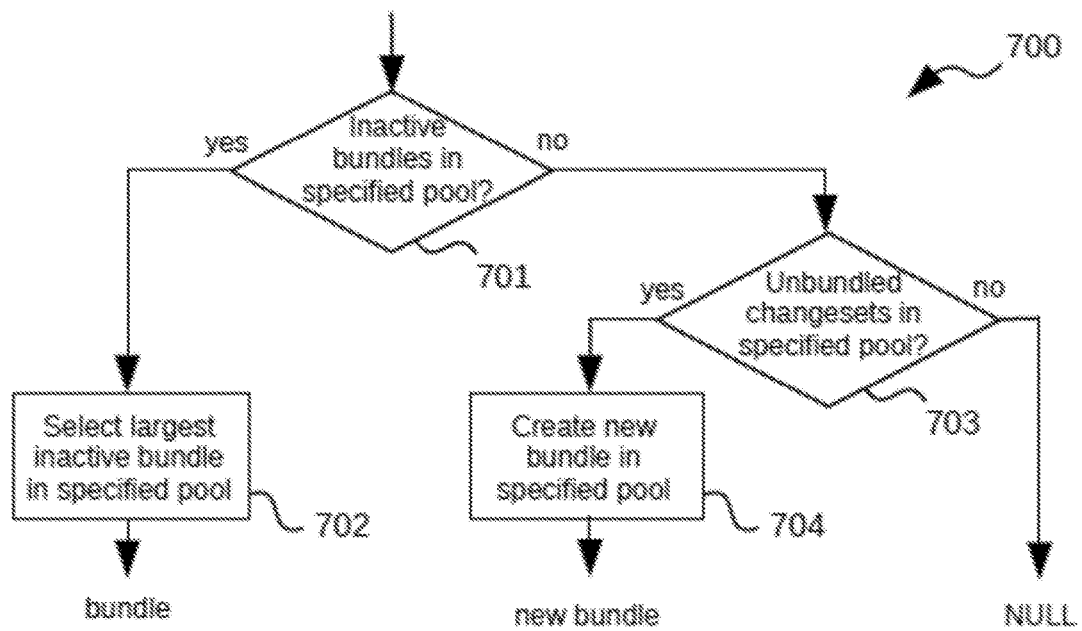
FIG. 7 is a logical diagram of an automated process for selecting regular bundles for pre-commit or preliminary quality verifications, in accordance with one embodiment.

For example, regular bundle creation events 412 can be generated from a regular bundle selection process, schematically illustrated as process 700 in FIG. 5 and further detailed at FIG. 7 (i.e. see step 704 of FIG. 7), that is invoked from the pre-commit bundle selection process 500 using as specifications the regular changeset pool 401 and the pre-commit bundle pool 402. In one embodiment, multiple regular bundles can co-exist simultaneously in the pre-commit bundle pool 402.

Figure 6:
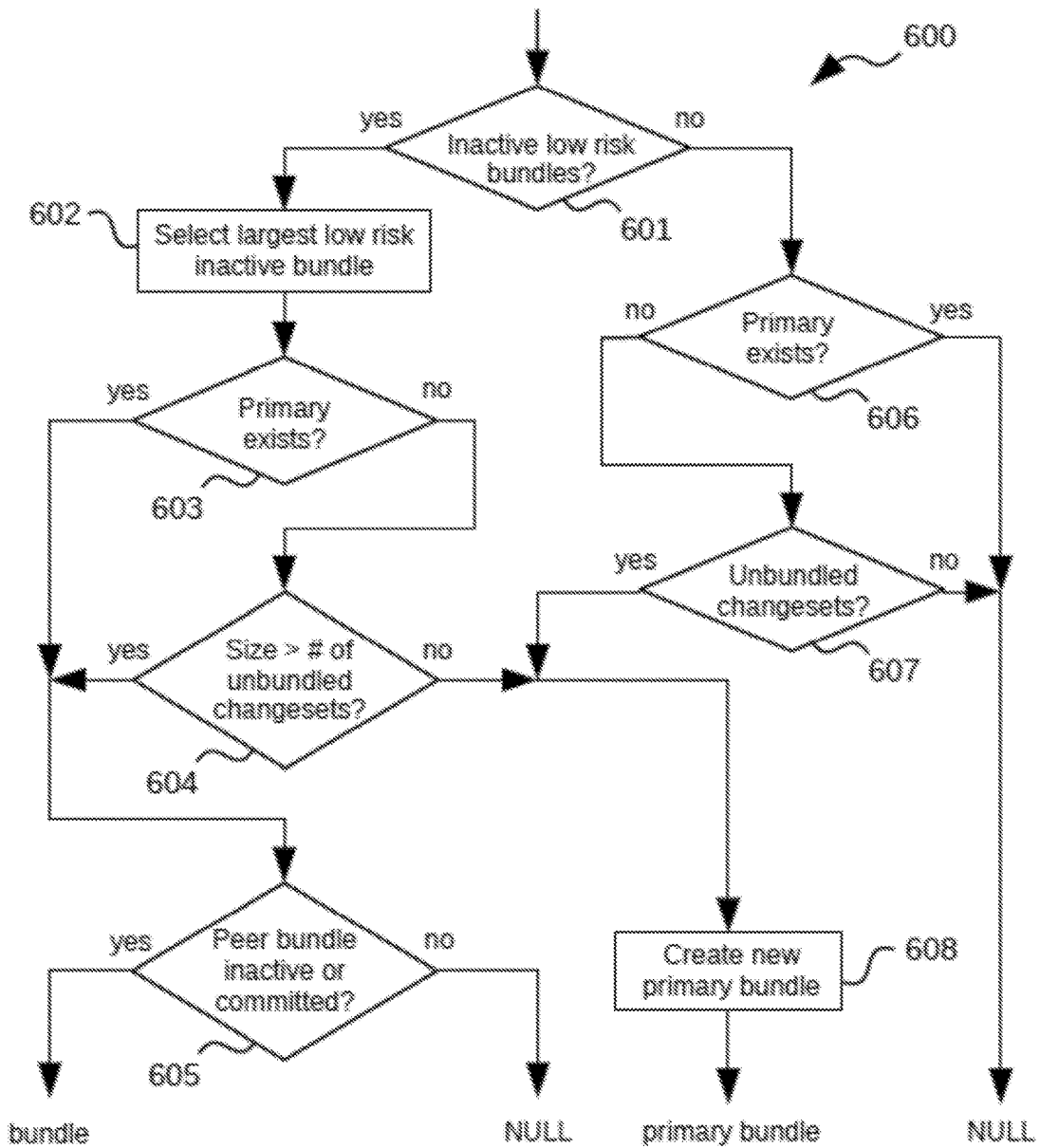
FIG. 6 is a logical diagram of an automated process for selecting low risk bundles for pre-commit quality verifications, in accordance with one embodiment.

Likewise, primary bundle creation events 413 can be generated from a low-risk bundle selection process, schematically illustrated as process 600 in FIG. 5 and further detailed at FIG. 6 (i.e. see step 608 of FIG. 6), that is invoked from the pre-commit bundle selection process 500. Unlike regular bundles, only a single primary bundle will generally exist in the pre-commit bundle pool 402 at any given time since primary bundles, as will be described in greater detail below, are generally processed in a serialized manner for optimal results.

As noted above, bundle selection events 414 are generated when the pre-commit bundle selection process 500 returns a bundle selected for processing in the pre-commit verification block 415. Upon selection, each selected bundle at step 414 is passed as verification context specification to the input port IN of the pre-commit verification block 415, which performs a pre-commit quality verification of the selected bundle, as further detailed by the pre-commit verification process generally illustrated in FIG. 12 and further detailed in FIGS. 13 and 14, for example.

As a result of the pre-commit verification block 415, bundle split events 416 may occur when pairs of child bundles are produced from a parent bundle at the output port SPLIT of the pre-commit verification block 415, for instance upon identifying one or more blocking regressions caused by the changesets forming part of the verified parent bundle. These child bundles are placed back into the pre-commit bundle pool 402 for subsequent pre-commit quality verifications in progressively parsing out the one or more conflicting or faulty changesets originating from the parent bundle.

Generally, changeset rejection events 417 will occur when individual changesets identified to be causing blocking regressions in the pre-commit quality verification, for example subsequent to sequential bundle splitting and verification events having led to the isolation of one or more conflicting or faulty changesets, are produced at the output port X of the pre-commit verification block 415. Each such changeset is passed to the output port X of the pre-commit verification stage 400, and ultimately returned to its originator or another developer to be revised and resubmitted in due course for pre-commit verification.

Successful bundle quality verification events 418, on the other hand, occur when a successfully verified bundle is produced at the output port PASS of the pre-commit verification block 415. In one embodiment, a bundle commit decision process 900, such as that detailed for example in FIG. 9, can be executed on the successful bundle for further processing and/or final committal. For example, the bundle changeset promotion trigger 441 can be activated if the bundle commit decision process 900 is executed for a regular bundle, in which case the automated output decision of process 900 will generally be to favour promotion of the verified bundle and its changesets to the low risk change set pool 403 rather than to commit the bundle. The trigger 441 will generate a promotion event 419, in response to which, the CIS Controller 110 will remove all changesets bundled in the successfully verified bundle from the regular changeset pool 401 to place them into the low risk changeset pool 403, and remove the successfully verified bundle from the pre-commit bundle pool 402.

On the other hand, a bundle commit trigger 442 may be activated if the decision of the bundle commit decision process 900 is to commit the successfully verified bundle, which in this example, is generally reserved for successful primary bundles or backup regular bundles, if available in the event of a primary bundle failure. In response to the commit trigger 442, the successful bundle, which in this example contains verified changesets from the low risk changeset pool 403, will be presented at the output port COMMIT of the pre-commit verification stage 400 to be committed to the integration branch.

With added reference to FIGS. 5 to 7, the pre-commit bundle selection process 500 will now be described, in accordance with one embodiment. In this example, the pre-commit bundle selection process 500 is used in the pre-commit verification stage 400 for triggering regular bundle creation events 412, primary bundle creation events 413 and bundle selection events 414, as noted above.

Generally, the pre-commit bundle selection process 500 will be invoked when: quality verification resources in the pre-commit verification block 415 become available (e.g. upon completion of a previous bundle pre-commit quality verification); new changesets are placed in the regular changeset pool 401 following incoming changeset events 411; new changesets are placed in the low risk changeset pool 403 following promotion events 419; and/or quality verification resources are added to the pre-commit verification block 415.

In the illustrated example, priority bundle selection is given to low risk bundles in the pre-commit bundle pool 402 containing changesets from the low risk changeset pool 403 by first invoking the low risk bundle selection process 600 exemplarily illustrated in FIG. 6. In one embodiment, prioritizing low risk changesets ensures no blockage can occur in the changeset flow from the regular changeset pool 401 through the low risk changeset pool 403 and out the output port COMMIT of the pre-commit verification stage 400.

Continuing with this example, and with added reference to FIG. 6, the low-risk bundle selection process 600 will first perform a test 601 to check if any inactive low risk bundles are present in the pre-commit bundle pool 402. If so, in step 602, the largest inactive low risk bundle in the pre-commit bundle pool 402 is selected for further consideration.

The following test 603 checks if a primary bundle exists. The existence of a primary bundle, in this example, indicates that a search for identifying a conflicting changeset causing a blocking regression is not currently being performed on the critical path.

On the other hand, if a primary bundle does not exist, a further test 604 checks if the size of the selected low risk bundle is bigger than a number of unbundled low risk changesets available in the low risk changeset pool 403 that could otherwise be bundled into a new primary bundle. If not, the selected low risk bundle is dropped in favour of forming a new primary bundle from available unbundled low risk changesets at step 608).

In the illustrated example, an automated search to identify a conflicting changeset is started on the critical path in response to a recent primary bundle split event, with no new primary bundles being created in the interim. As the search advances, progressively smaller bundles are generated and ultimately committed due to sequential splits, which gradually lowers the average changeset commit rate. To prevent reaching prohibitively low average changeset commit rates, the search is moved off the critical path when it is possible to create a new primary bundle that is bigger than the bundles being subject to the search. As such, the combination of tests 603 and 604 automate the decision of moving a potentially lengthy search to identify a conflicting changeset off the critical path by allowing the creation of a new primary bundle at step 608.

If the selected low risk bundle is larger than the number of unbundled low risk changesets in the low risk changeset pool, test 605 checks whether the selected low risk bundle has a peer under active verification. If the bundle's peer is inactive or has already been committed, the test 605 will confirm selection of the selected low risk bundle for verification; the test 605 will otherwise reject the bundle selection as peers should generally not be processed in parallel. This step is generally invoked to avoid selecting a low risk child bundle that contains a changeset that in fact conflicts with another changeset in this child's peer bundle. This may occur when a common parent bundle is ultimately split into child bundles upon detection of a blocking regression that is in fact instigated by now split conflicting changesets, whereby each child bundle may otherwise successfully pass the pre-commit quality verification and thus effectively hide the conflict and prematurely terminate the search for the conflicting changesets, which would need to be restarted from scratch. To avoid this issue, test 605 is implemented to ensure the serialization of peer bundles for pre-commit quality verifications. As such, either of the conflicting changesets can in the end be rejected since either of them can cause the blocking regression simply by being committed after the other changeset with which it is in conflict.

If an inactive low risk bundle is not available, at step 610, test 606 will check if a primary bundle exists, ensuring only one primary bundle can exist at any given time. If not, test 607 checks if unbundled low-risk changesets are available in the low risk changeset pool 403 to create a new primary bundle, which is created at step 608 by invoking, in one example, the changeset bundling process 1000 schematically illustrated in FIG. 10 to bundle low risk changesets from the low risk changeset pool 403 into a new primary bundle to be placed in the pre-commit bundle pool 402. The creation of a new primary bundle will generate a primary bundle creation event 413, and this new primary bundle will be selected for further processing.

As may be expected, any NULL result in the low risk bundle selection process 600 will mean that no low risk bundle could be selected as a result of this process. The bundle selection process 500 will then move on to the regular bundle selection process 700, schematically illustrated in FIG. 7, which is applied to the pre-commit bundle pool 402 to select regular bundles containing changesets from the regular changeset pool 401, if available.

In this example, a test 701 first checks for any inactive regular bundles in the pre-commit bundle pool 402, from which the largest inactive regular bundle is selected for further processing at step 702. Otherwise, a test 703 checks if any unbundled regular changesets exist in the pre-commit changeset pool 401. If so, a bundle creation process, such as process 1000 of FIG. 10, is invoked to bundle regular changesets from the pre-commit regular changeset pool into a new regular bundle to be placed in the pre-commit bundle pool for selection by process 500 and further processing by pre-commit verification block 415. Otherwise, a NULL result is generated indicating that no regular bundles are available at that time for further processing, which leads to no further operation ("NOP").

Ultimately, any bundle returned by either the low risk bundle selection algorithm 600 or the regular bundle selection algorithm 700 is selected as selection 414 output by the pre-commit bundle selection process 500 for processing by the pre-commit verification block 415.

With reference to FIG. 10, and in accordance with one exemplary embodiment, logical process executed in an exemplary changeset bundling process 1000 will now be described, in which the process 1000, as introduced above, is used to group unbundled changesets of a specified type present in specified changeset pool (e.g. low-risk, regular, preliminary) into a new bundle that will be placed in the specified bundle pool (e.g. pre-commit, preliminary).

In this example, the changeset bundling process 1000 can be invoked from step 608 of the low-risk bundle selection process 600 to create a new primary bundle, or again invoked from step 704 of the regular bundle selection process 700 to create a new regular bundle, for example.

In step 1001, a list of not yet bundled changesets of the specified type from the specified changeset pool is obtained.

In step 1002, a new bundle is created. The new bundle is a primary bundle if the changeset bundling process 1000 is invoked from step 608 of the low-risk bundle selection process 600, otherwise it is defined as a regular bundle. The CIS Controller 110 creates a new level 1 bundle in the CIS Database 112.

The loop 1003 iterates through each changeset in the list adding the iteration changeset to the new bundle if it meets the necessary criteria.

The file overlap test 1004 checks if the iteration changeset touches any file touched by any other changeset already added to the bundle. This ensures no two changesets touching the same file are ever present in the same bundle. The primary reason for this orthogonality check is that patching such changesets into the same workspace may depend on the order in which the changesets are patched and may require merging of the software changes, which cannot always be automated. Another reason is that any optimization method of identifying a changeset causing a blocking regression based on the modified files would generally not be possible if the file is modified by multiple changesets simultaneously.

The conflict test 1005 checks if the changeset is on any of the potential conflict list of any of the changesets already present in the bundle.

The maximum bundle size test 1006 is used to break out of the iteration loop 1003 when the number of changesets added to the bundle reaches a maximum value determined from data previously accumulated in the CIS Database 112 during system operation for the specified changeset pool. The maximum bundle size value is the maximum $2^n$ value for which the newly created bundle does not reach 100% probability of being split. In one embodiment, the probability of a bundle being split is equal to the changeset rejection rate for the specified changeset pool, which is the percentage of changesets rejected in the quality verifications associated with the specified pool out of the total number of changesets reaching the pool. For example a rejection rate of 4% means that 1 in 25 changesets is rejected, thus the maximum recommended bundle size is 16. If the number of changesets rejected in the specified pool is below a certain threshold value the data previously accumulated in the CIS Database 112 is considered insufficient and no maximum bundle size is imposed. This threshold value can be made user-configurable with an arbitrarily selected default value, for example, of ten (10).

In step 1007 the iteration changeset is added to the bundle. The CIS Controller 110 adds the iteration changeset ID to the bundle's changeset list.

In step 1008 the CIS Controller 110 places the newly created bundle into the specified bundle pool.

The changesets from the list which are not added to the newly created bundle remain in the specified changeset pool. They will be added to new bundles created in subsequent invocations of the changeset bundling algorithm 1000 for the specified changeset pool.

Figure 12:
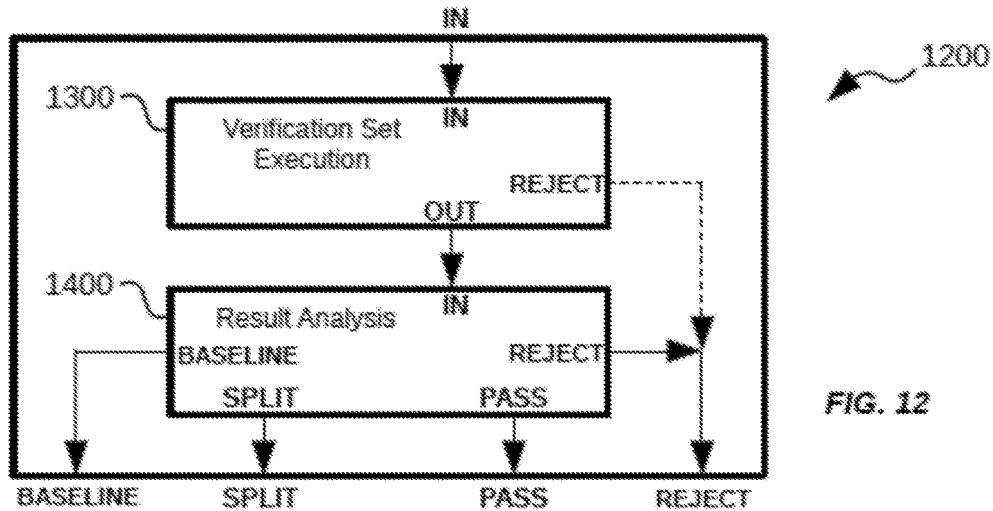
FIG. 12 is a logical internal operation flow diagram of a pre-commit or a preliminary verification block, in accordance with one embodiment.
Figure 13:
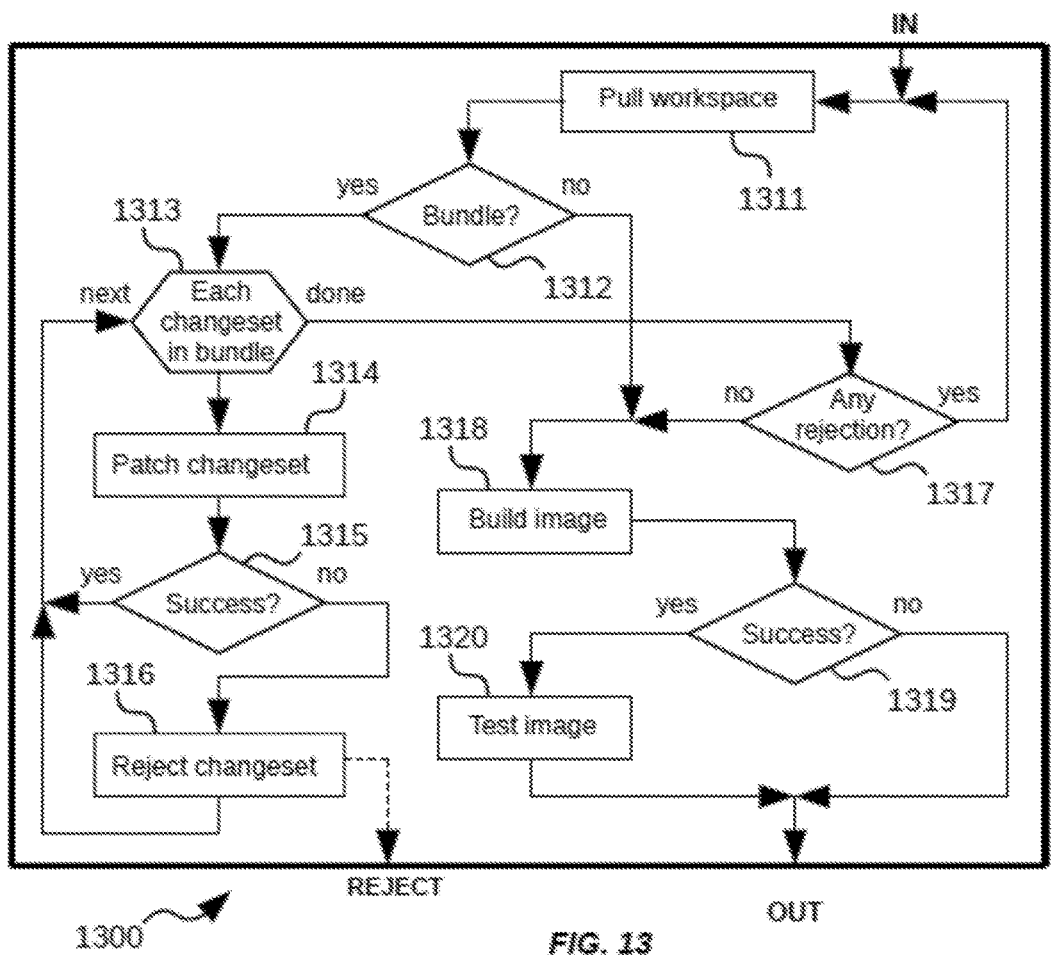
FIG. 13 is a logical internal operation flow diagram of an exemplary verification set execution block, in accordance with one embodiment.

With reference now to FIGS. 12 to 14, an exemplary internal operation logic flow of the pre-commit verification block 415 will now be described, in accordance with one embodiment. This process may be similarly applied to the preliminary verification block 814 of any of the preliminary verification stages 800 described in greater detail below in accordance with another embodiment, noting likely differences in their respective verification set configurations and the context of each quality verification execution, for example.

In this particular example, each verification block 1200 will contain a verification set execution block 1300 and a verification result analysis block 1400. Generally, a verification context specification presented at the input port IN of the verification block 1200 is passed to the input port IN of the verification set execution block 1300. The verification context can be either a VCS label or a bundle.

The verification set execution block 1300 performs the actual software quality verification according to the verification context specification and the verification set configuration. In the exemplary embodiment depicted in FIG. 13, the verification set execution is performed on the quality verification resources 150, driven by the CIS Agent 120 under the control and supervision of the CIS Controller 110. The operation of an actual verification set execution block depends on the verification set configuration for that block, which depends on the particularities and requirements of the project. A verification set can contain one or more verification steps to be executed in a certain sequence, some verification steps depending on the completion of one or more other verification steps in the sequence, as specified in the verification set configuration.

To accommodate the wide variety of types and implementations of verification steps that may be used for quality verifications in a software development project, an embodiment of the CIS considered herein uses quality verification wrapper applications stored in the CIS Storage 113 to manage the operation of verification steps. Each verification step in a verification step configuration could thus have an associated quality verification wrapper application configured in the verification set configuration file. Generally, a failure to locate or successfully execute the quality verification wrapper application for a given verification step would be treated as an abnormal termination of the verification step.

Depending on the particularities of the software project, the verification wrapper applications for some types of verification steps may invoke the CIS VCS wrapper application to perform VCS operations like pulling workspaces or patching candidate software changes.

The quality verification wrapper applications will generally be capable of performing the following operations: enqueue a verification step request for execution and obtain a request identifier; and provide information about an enqueued verification step request, comprising: the status of the request (QUEUED, RUNNING, COMPLETED or ABORTED); the identifier of the quality verification resource on which the request execution started, and the results matrix obtained in the request execution for completed requests.

A quality verification step launch event can be recorded in the CIS database 112 when the quality verification wrapper application is launched to start the verification step execution, containing the invocation context information. When the execution completes, the log produced by the quality verification wrapper application can be stored on the CIS Storage 121 and a quality verification step completion event can be recorded in the CIS database 112, with context information containing the identifier of the log in the CIS Storage 121 and, if available, references to specific verification step information, for example links to a specific test status page in the specific testing infrastructure web interface. Such information is generally only used for reference or reporting purposes.

For most verification step types, the result of the verification step would be a results matrix containing a single value (PASS, FAIL, ABORT or RETRY). For build verification, the result is a matrix of the configured artifact identifiers and their corresponding build result (PASS, FAIL, ABORT or RETRY). For test verifications, the result is a matrix of all the separately identifiable test cases and subcases executed and their corresponding test results (PASS, FAIL, ABORT or RETRY).

A verification set configuration is used to completely describe, for example in a standard modeling language (like YAML, XML, etc.), the sequence of quality verification steps of a verification set execution block and the dependency of one quality verification step execution on completion of other quality verification steps in the same sequence. Each verification set configuration may contain: a unique verification block identifier; a list of verification step configurations, one such verification step configuration for each of the quality verification steps in the verification set execution block, each such verification step configuration comprising: a unique verification step configuration identifier; a list of quality verification resources 150 which can be used for performing the corresponding quality verification step; an identifier of the particular quality verification wrapper application, stored on the CIS Storage 113, to be used to manage the execution of corresponding quality verification step; and a sequencing information representing the execution ordering and dependencies of the verification steps in the verification set execution block.

Verification set configurations may need to contain additional configurations specific to verification steps of certain types, depending on the software project particularities. For example, some build verification steps may require a list of identifiers of the artifacts to be built, or a particular location where the built artifacts need to be copied in order for those artifacts to be accessible in subsequent verification steps.

Verification set configurations are stored in the CIS Database 112 and mirrored on the CIS Storage 121 for local access from the quality verification resources 150.

As noted above and as will be described in greater detail below, in the presence of additional optional verification stages such as one or more preliminary verification stages, the verification set configurations may be different for quality verification blocks present in different verification stages, distinguishing one verification stage from another. However, any verification step sequence present in the verification set configuration of a preliminary verification block (i.e. see blocks 814 of FIGS. 3 and 8), for example, should also be present in the verification configuration of the pre-commit verification block 415, which is generally the only verification stage in this example capable of preventing all blocking regressions caused by conflicting changesets (i.e. final pre-committal step of the verification process).

In this example, the operation of the exemplary verification set execution block 1300 relies on a verification set consisting of building an image of the project and testing it. The verification steps included in this exemplary verification set include: pulling a workspace, patching the candidate changesets into that workspace, performing a build in the workspace to obtain the image, and testing the image. The skilled artisan will appreciate that the verification set configuration can be much more complex for very large software systems, for example, and that such complex verification set configurations may also be considered herein without departing from the general scope and nature of the present disclosure.

FIG. 13 further illustrates this example. At step 1311, a workspace based on a specific label from the software project's branch is pulled. If the verification context presented at the input port IN of the verification set execution block 1300 is a label, then that label is used for pulling the workspace. If the verification context presented at the input port IN of the verification set execution block 1300 is a bundle, then the project's current baseline label is used for pulling the workspace.

The test 1312 then checks if the verification context presented at the input port IN of the verification set execution block 1300 is a bundle or a label. In the case of a label, an image will be built and tested, and the results thereof output via the output port OUT for further processing by the results analysis block 1400.

In the case of a bundle, the loop 1313 iterates on each changeset present in the bundle from the verification context presented at the input port IN of the verification set execution block 1300. For instance, in step 1314, the software changes from the iteration changeset are patched into the workspace pulled in step 1311, and the test 1315 checks if step 1314 was successful.

At step 1316, the iteration changeset for which step 1314 was not successful is presented to the output port REJECT of the verification set execution block 1300. The CIS Controller 110 is informed by the CIS Agent 120 and removes the iteration changeset from the bundle. The loop 1313 is not interrupted by the changeset rejection. However, if no other changesets remain in the bundle after the rejection, the CIS Controller 110 aborts the entire operation of the verification block 1200 and cancels the bundle.

Once the loop 1313 has completed, the test 1317 checks if any of the changesets from the bundle specified in the verification context was rejected in step 1315. If so, the entire operation of the verification set execution block 1300 is restarted from scratch to ensure that no traces of the rejected changeset patch attempt impacts the verification of the remaining changesets in the bundle.

Otherwise, in step 1318, a build is performed in the workspace pulled in step 1311 to obtain the image to be tested in step 1320. A test 1319 checks if the build executed in step 1318 was successful and if the image to be tested in step 1320 was obtained, in which case, the image is tested in this step. Note that the steps 1318, 1319 and 1320 are present in this exemplary verification set execution block 1300 because they are specified in the verification set configuration for this block.

The results matrix of all the verification steps executed in the verification set execution block 1300 is presented together with the verification context at the output port OUT of the verification set execution block 1300. The results matrix will not contain results for the verification steps configured in the verifications set configuration but not executed, typically because of failures in earlier verification steps.

Any changeset produced at the output port REJECT of the verification set execution block 1300 is presented at the output port REJECT of the verification block 1200, thus resulting in the ultimate rejection of the changeset (rejection 202 of FIGS. 2 and 3). Otherwise, the results and the context of the verification produced at the output port OUT of the verification set execution block 1300 are passed to the input port IN of the verification result analysis block 1400.

With added reference to FIG. 14, the verification result analysis block 1400 in this example will be described in further detail. As noted above, the results matrix and the context of the software quality verification output from block 1300 are presented at the input port IN of the verification result analysis block 1400.

At step 1401, the CIS Controller 110 stores the results matrix in the CIS Database 112 for future reference. The test 1402 checks if the context of the verification was a bundle or a label.

If the context of the verification is a label, the results matrix is associated with that label, which is then presented at the output port BASELINE of the verification result analysis block 1400. This happens when the CIS is activated on the branch and the initial project baseline VCS label is applied to obtain the results matrix associated with this initial label. The results matrices for any subsequent project baseline labels are obtained in the pre-commit verifications of the committed bundles. This can also happen in an optional post-commit verification block, for each of the new VCS labels applied on the software project branch after bundles are committed.

If the context of the verification is a bundle, then the results matrix is associated with that bundle and is compared to the results matrix associated with the project's baseline label to detect any blocking quality regression. For example, test 1403 can quickly check if the overall result of the results matrix is a PASS.

If not, the loop 1404 iterates through each criterion in the results matrix. The test 1405 checks if the result of the iteration criterion in the results matrix is a failure, and if so, the test 1406 checks if the criterion exists in the results matrix associated with the project's baseline label and if its result is a success, thus seeking to isolate failures unique to the bundle and thus representative of a blocking quality regression. In other words, the combination of tests 1405 and 1406 implements a result baseline comparison ensuring that only blocking regressions are taken into consideration as failures into the operation of the CIS 100.

If blocking quality regressions are identified, a test 1408 checks if more than one changeset is present in the bundle. If only one changeset is present in the bundle, that changeset rejected at the output port REJECT of the verification result analysis block 1400 (and overall REJECT port of block 1200). Otherwise, the bundle is split at step 1409, for example using the bundle splitting process 1100 illustrated in FIG. 11 and described further below, as part of a search to identify the changeset causing the blocking regression. The two child bundles resulting from the bundle splitting process 1100 are presented at the output port SPLIT of the verification result analysis block 1400 (and verification block 1200).

If no blocking quality regressions are detected, the information about potentially conflicting changesets is updated at step 1407 if necessary, before being output at the output port PASS of the block 1400. For instance if the verified bundle has a peer and its peer bundle was also successfully verified, then it is possible that conflicting changesets causing the regression in the parent bundle were separated during the split in the two child bundles. In such cases, the list of potentially conflicting changesets for each changeset in each child bundle will be updated to include all changesets from the peer bundle. The non-blocking bundle is then produced at the output port PASS of the verification result analysis block 1400 and verification block 1200, to be processed by the commit decision process 900 introduced above and further described below.

As introduced above, and with reference now to FIG. 11, an illustrative bundle splitting process 1100 will now be described, in which a blocking bundle identified in step 1409 of FIG. 14 is split in a search to identify one or more changesets causing a blocking regression. Generally, the repeated splitting of a failing bundle into progressively smaller child bundles will end when child bundles each containing a single changeset fail, positively identifying in a finite number of steps that particular changeset as the one causing the blocking regression. As a positive side effect, this approach also offers some tolerance to quality verification failures caused by intermittent issues not actually related to the changesets being verified.

In particular, at step 1101, the CIS Controller 110 creates two empty child bundles. A test 1102 checks if a method for identifying a suspect changeset is available for the type of regression detected and if it is thus able to identify a suspect changeset in the bundle in question. It will be noted that the method does not have to be 100% precise; it can be a heuristic method.

If the suspect changesets identified by the methods used in test 1102 are indeed causing a regression, the number of bundle splits required to identify it may be reduced. However, if the suspect identified proves to not cause a regression, the number of splits may be increased. Accordingly, the method should have a rather high probability of success.

Means for manually flagging a changeset as suspect for a particular detected blocking regression can also be provided in the CIS Interface 113 to take advantage of superior human analytic capabilities. Such flags can be used as an optimization in subsequent bundle splits, for example, if the same blocking regression type is detected for one of the child bundles resulting from this bundle split.

The reduction or increase impact on the number of splits is proportional with the bundle size. As the system operates, the actual rates of success of the methods used in tests 1102 can be measured and an automated process for deciding if a particular method should be used or not based on the method's success rate and the bundle size can be developed.

In step 1103, the CIS Controller 110 places the highest possible 2" number of the changesets from the bundle being split in the first child bundle and the rest of the changesets in the second child bundle for a binary search for identifying the changeset causing the regression. The highest possible 2" number of changesets is chosen because it is optimal for reducing the worst case number of bundle splits necessary to identify the changesets causing the blocking regressions. Other techniques may also be employed, as will be appreciated by the skilled artisan, without departing from the general scope of the present disclosure.

In step 1104, the CIS Controller 110 places the suspect changeset identified by test 1102 into the second child bundle and the rest of the changesets from the bundle being split in the first child bundle. The suspect changeset will undergo another quality verification in the second child bundle to confirm that it is indeed the changeset causing the regression before it is rejected.

In step 1105, the CIS Controller 110 places both child bundles created in step 1101 into the same bundle pool as the bundle being split for the child bundles to go through the same quality verification. The CIS Controller 110 then removes the bundle being split from that bundle pool.

Figure 9:
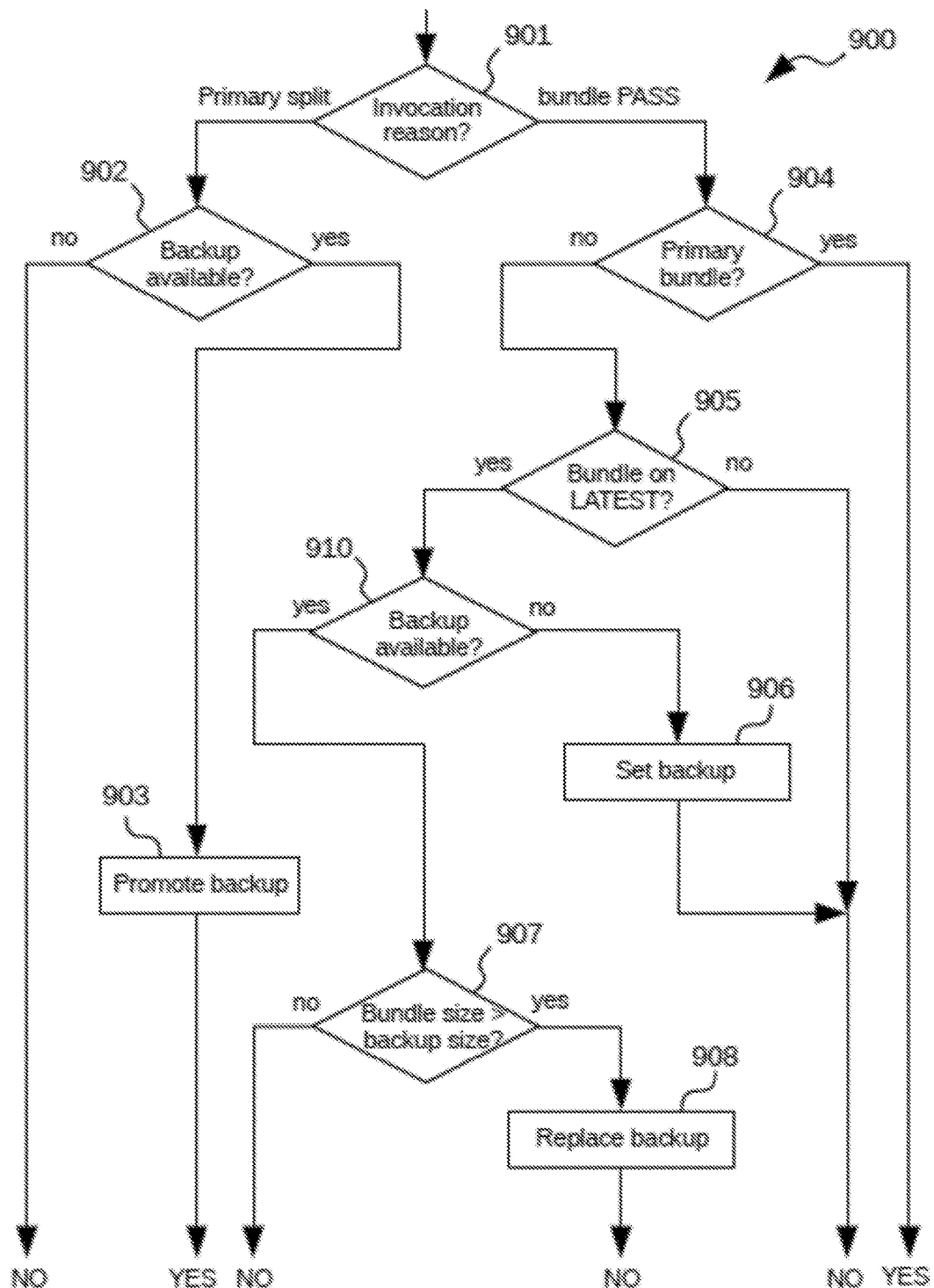
FIG. 9 is a logical diagram of an automated process for executing a bundle commit decision, in accordance with one embodiment.

As introduced above, and with reference now to FIG. 9, an illustrative bundle commit decision process 900 will now be described, in which a passing bundle identified by the verification process 1200 of FIG. 12 is output from the pre-commit verification block 415 of FIG. 4. In general, the bundle commit decision process 900 is invoked in the pre-commit verification stage 400 either when a bundle is successfully verified in the pre-commit verification block 415, or when the primary bundle is split due to a regression detected in the pre-commit verification block 415. Accordingly, a test 901 will first check the reason for which the bundle commit decision process 900 was invoked, which can be either a successful pre-commit quality verification of a bundle or a split of the primary bundle.

In the case of a primary bundle split, a test 902 checks if a backup bundle is available. The backup bundle at any particular moment, if available at that moment, is defined in this example as the best regular bundle that has passed the pre-commit quality verification on the LATEST label current at that particular moment. In this exemplary embodiment, only one regular bundle in the pre-commit verification pool 402 can be designated as the backup bundle at any given time. If a backup bundle is available, in step 903 the available backup bundle is promoted to primary and will be committed instead since the primary bundle failed the pre-commit quality verification and a potentially lengthy search for the changeset causing the regression needs to be performed. In the absence of a backup bundle, no bundle is committed at this time.

In the case of a bundle pass invocation, a test 904 checks if the successfully verified bundle is the primary bundle. If so, the primary bundle is committed at this time (and a backup bundle designation, if it exists, is removed as noted above as this backup bundle would no longer satisfy the requirement that it be verified against the LATEST label, the committal of the primary bundle in this step producing a new label). Otherwise, a test 905 checks if the successful quality verification of the bundle was performed on the currently LATEST label. If not, the verified bundle is not committed at this time pending verification on the currently LATEST label.

If the successful bundle was verified against the current LATEST label, a test 910 checks to see if a backup bundle is available. If not, in step 906, the backup bundle role is assigned to the successfully verified bundle.

If a backup bundle is available at step 910, a test 907 checks if the size of the successfully verified bundle is bigger than the size of the backup bundle. If not, the changesets of the verified bundle are promoted to the low risk changeset poll 403 for further processing. Otherwise, in step 908, the backup bundle role is re-assigned to the successfully verified bundle, which is better than its predecessor backup bundle given its larger size (i.e. promotes a greater commit rate average when eventually committed).

From this example, it will be appreciated that while regular bundles may be processed for pre-commit verification in parallel, as ultimate committal of any bundle at any given time is limited to the serial committal of the unique primary bundle, or in the event of a primary split, the serial committal of the unique backup bundle, committal of conflicting changesets that could result in a blocking quality regression is generally avoided by the processes and systems disclosed herein. Namely, the serial committal of bundles ensures that even if a conflicting changeset exists in a given changeset pool, this potentially conflicting changeset will be pre-commit tested against any and all previously serially committed bundles and a conflict thereby detected prior to committal of that potentially conflicting changeset.

Furthermore, as the primary and backup bundles are generally confirmed as verified on the current LATEST label before committal, the committal of faulty changesets that could result in a blocking quality regression is also generally avoided.

With reference to FIG. 3, and in accordance with another exemplary embodiment, a logical operational flow diagram of the CIS 100 of FIG. 1 will now be described, in which the pre-commit verification stage 400 is preceded by an optional preliminary verification chain containing one or more preliminary verification stages 800. In this illustrated example, the changesets resulting from submission events 201 are first preprocessed via an input port IN of a first preliminary verification stage 800 in the preliminary verification chain. Each preliminary verification stage 800 groups multiple non-overlapping changesets into bundles, performs the respective stage's preliminary quality verification on these bundles and identifies the changesets causing blocking regressions, if any. An exemplary logical flow of each preliminary verification stage 800 is provided in FIG. 8 and described in greater detail below.

Again, rejection events 202 are triggered when individual changesets identified to be causing blocking regressions are produced at the output port X of any of the preliminary verification stages 800.

On the other hand, inter-stage promotion events 302 are triggered when successfully verified bundles of changesets are produced at the output port OUT of a given preliminary verification stage 800 in the preliminary verification chain. These changesets are passed to the input port IN of the next preliminary verification stage 800 in the preliminary verification chain, and ultimately to the input port IN of the pre-commit stage 400, distinctly noted as promotion events 303, from which the remainder of the CIS operation is replicated as illustrated in the embodiment of FIG. 2, described above, and so forth.

As will be appreciated by the skilled artisan, the use of on optional preliminary verification chain containing one or more preliminary verification stages 800 can reduce the probability of changesets causing blocking regressions from reaching the pre-commit verification stage 400.

Figure 8:
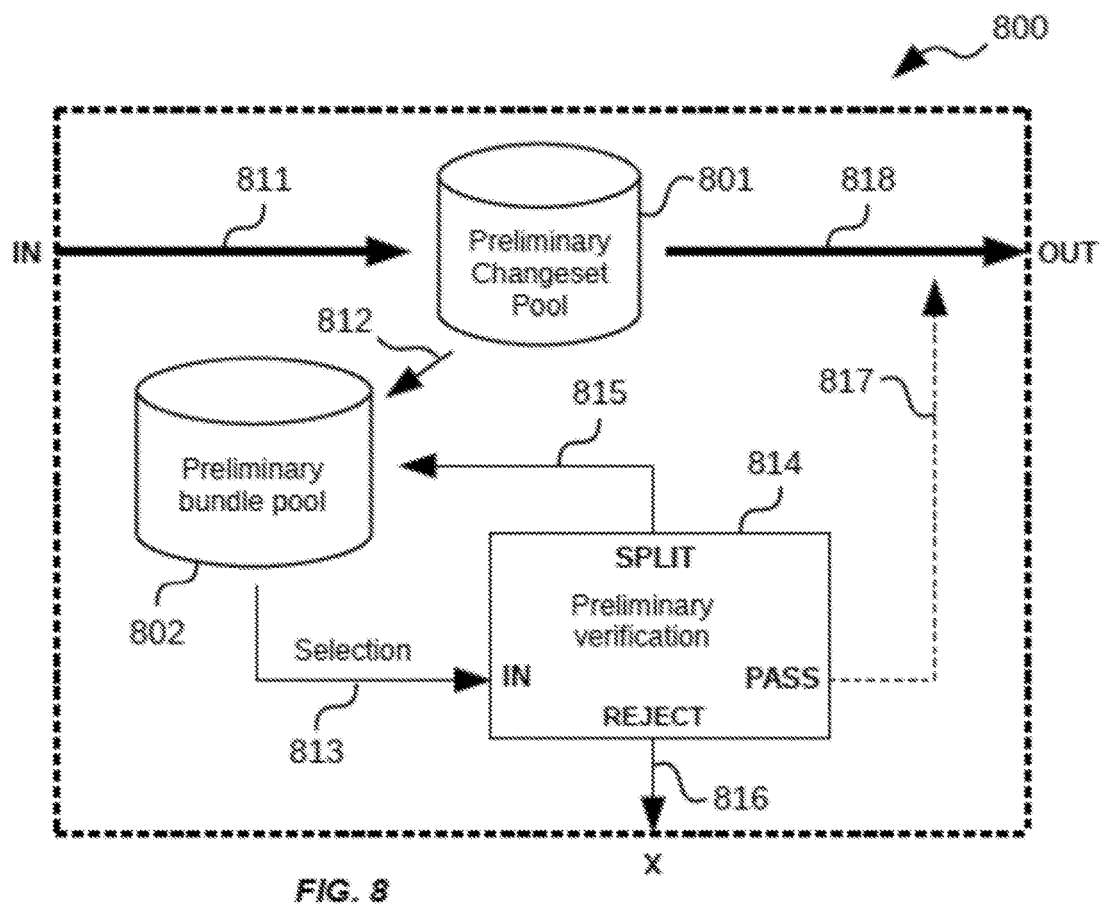
FIG. 8 is a logical internal operation flow diagram of an optional preliminary verification stage, in accordance with one embodiment.

With added reference to FIG. 8, a logical flow of an exemplary internal operation of a given preliminary verification stage 800 will now be described, in accordance with one embodiment. In the illustrated example, incoming changeset events 811 occur when changesets are passed to the input port IN of the preliminary verification stage 800 either by submission events 201, or by promotion events 302 from a previous preliminary verification stage 800 in the preliminary verification chain. The incoming changesets are placed into the stage's preliminary changeset pool 801.

In each preliminary verification stage 800, bundle creation events 812 and bundle selection events 813 can be triggered, for example, as described above in the context of the regular bundle selection process 700 illustrated in FIG. 7, but applied in this case to the preliminary bundle pool 802 to select bundles containing changesets from the preliminary changeset pool 801 for preliminary quality verification in a preliminary verification block 814. For example, the bundle selection process can be invoked in a given preliminary verification stage 800 when quality verification resources in the preliminary verification block 814 become available by completion of a bundle preliminary quality verification; new changesets are placed in the regular changeset pool 801 following incoming changeset events 811; or when quality verification resources are added to the preliminary verification block 814. As in the main pre-commit verification process 400, multiple preliminary bundles can co-exist simultaneously in the preliminary bundle pool 802.

As noted above, implementation of any of the optional preliminary verification blocks 814 can be executed more or less as described above with reference to FIGS. 12 to 14 in the context of pre-commit verification block 415, noting again as above likely differences in their respective verification set configurations and the context of each quality verification execution, for example, when comparing respective preliminary verification blocks 814, as well as any such preliminary verification block and the pre-commit verification block 415. Namely, as noted above, the verification set configurations may be different for quality verification blocks present in different verification stages, distinguishing one verification stage from another. However, any verification step sequence present in the verification set configuration of a preliminary verification block 814 should also be present in the verification configuration of the pre-commit verification block 415, which is generally the only verification stage in this example capable of preventing all blocking regressions caused by conflicting changesets.

Tuning the System's Operation

Given a certain submission rate of candidate changesets for integration into the project's branch with certain probabilities of containing faulty and/or conflicting changesets causing blocking regressions detectable in certain steps of the quality verifications, the achievable changeset commit rate can greatly depend on the number of quality verification resources available for each quality verification step in the pre-commit and/or the preliminary verification stages and the number of the preliminary verification stages in the system configuration.

As illustrated in FIG. 3, the CIS 100 can be seen as a multi-stage processing pipeline receiving candidate changesets at one end, rejecting changesets causing quality regressions on side taps, and committing the successfully verified changesets at the other end. Each pipeline stage corresponds to a changeset pool in the system. The throughput of the entire processing pipeline is limited to the lowest throughput of any pipeline stage. Ideally the stage with the lowest throughput should be the last one in the pipeline, which corresponds to the low risk changeset pool 403 in the pre-commit verification stage 400, in the above-described example.

A pipeline stage operates optimally generating maximum throughput when newly created bundles select all non-overlapping unbundled changesets in the stage's changeset pool and the size of these bundles reaches the maximum bundle size for the stage's changeset pool. A pipeline stage operates under capacity when most of the newly created bundles don't reach the maximum bundle size for the stage's changeset pool. A pipeline stage is overloaded when often non-overlapping changesets are not selected in newly created bundles because the maximum bundle size for the stage's changeset pool is reached.

Any of the pipeline stages operating in overload condition for extended periods of time indicates that the maximum throughput of the processing pipeline is reached. The system continues to operate, but it may not be able to keep up with the candidate changeset submission rate.

The primary method for addressing a pipeline stage overloading is adding quality verification resources, allowing more bundles to be processed in parallel, until the stage operates under capacity. Adding quality verification resources also reduces the average time changesets spend in a pipeline stage.

For pipeline stages performing multi-step quality verifications which use different types of quality verification resources, generally only some of the resource types would contribute to the stage overload conditions and would need to be supplemented. These resource types can be identified from the operation data collected by the CIS Manager 111 during the operation of the CIS 100.

A secondary method for addressing a pipeline stage overloading is adding a preliminary verification stage in the system's processing pipeline, positioned before the overloaded stage in the processing pipeline. This method is generally only available for overloaded pipeline stages performing multi-step quality verifications. The number of changesets rejected for causing blocking regressions in each individual quality verification step can be obtained from the operational data collected by the CIS Manager 111 during the operation of the CIS 100 and stored in the CIS Database 112. If a verification step positioned earlier in the multi-step quality verification sequence is identified as having a significant corresponding rejected changeset number compared to a subsequent verification step in the multi-step quality verification sequence then this method is applicable. The quality verification in the added pre-verification stage would contain the identified verification step and all other preceding verification steps in the multi-step quality verification sequence the identified verification step depends on. The added pre-verification stage would then perform the searches for identifying the changesets causing blocking regressions in the identified verification step and reject them so that they no longer reach the overloaded stage.

While the present disclosure describes various exemplary embodiments, the disclosure is not so limited. To the contrary, the disclosure is intended to cover various modifications and equivalent arrangements included within the general scope of the present disclosure.

What is claimed is:

1. A computer-implemented method executed by a digital processor for automatically verifying submitted software changes in a continuous integration software development process, the method comprising:

receiving in a data store accessible to the processor, a plurality of submitted software changesets;

the digital processor creating at least one regular changeset bundle from said submitted software changesets;

the digital processor executing a predefined automated pre-commit quality verification on said at least one regular changeset bundle;

the digital processor promoting at least some successfully verified software changesets in said at least one regular changeset bundle as confirmed low-risk changesets;

the digital processor creating a primary bundle from said confirmed low-risk changesets;

the digital processor executing said pre-commit quality verification on said primary bundle against a current software development version label; and the digital processor committing at least some successfully verified low-risk changesets in said primary bundle to invoke a new software development version label to be set as said current software development version label in subsequent primary bundle verifications;

wherein a plurality of said regular changeset bundles are formed and verified in parallel to concurrently populate a low-risk changeset pool with said confirmed low-risk changesets; and wherein a single said primary bundle is created at any one time from said low-risk changeset pool.

2. The method of claim 1, wherein said primary bundle is serially created and committed.

3. The method of claim 1, wherein the method further comprises, after said receiving:

the processor creating at least one preliminary changeset bundle from said submitted software changesets;

the processor executing one or more predefined automated preliminary quality verifications on said at least one preliminary changeset bundle;

the processor promoting at least some successfully preliminarily verified software changesets in said at least one preliminary changeset bundle to a pre-commit changeset pool, wherein said at least one regular changeset bundle is created from said pre-commit changeset pool;

the processor isolating a blocking changeset as causing any said preliminary changeset bundle to fail any said predefined automated preliminary quality verification; and the processor rejecting said blocking changeset.

4. The method of claim 1, wherein the method further comprises, after said receiving:

the processor sequentially verifying said submitted software changesets across multiple preliminary verification stages, each one of which comprising:

the processor creating at least one preliminary changeset bundle;

the processor executing a predefined automated preliminary quality verification on said at least one preliminary changeset bundle;

the processor promoting successfully verified changesets in said at least one preliminary changeset bundle to a subsequent preliminary verification stage;

the processor populating a pre-commit regular changeset pool with changesets having been successfully sequentially verified across all of said multiple preliminary verification stages, from which to create said at least one regular changeset bundle;

the processor isolating a blocking changeset as causing any said preliminary changeset bundle to fail any of said one or more predefined automated preliminary quality verifications; and the processor rejecting said blocking changeset.

5. The method of claim 1, further comprising:

the processor isolating a blocking changeset as causing any one of said regular bundles and said primary bundle to fail said pre-commit verification; and the processor rejecting said blocking changeset pre-committal.

6. The method of claim 1, further comprising the processor executing a post-commit verification on said new software development version label.

7. A non-transitory computer-readable medium having statements and instructions stored thereon to be executed by a digital processor to automatically verify submitted software changes in a continuous integration software development process by:

creating at least one regular changeset bundle from said submitted software changesets;

executing a predefined automated pre-commit quality verification on said at least one regular changeset bundle;

promoting at least some successfully verified software changesets in said at least one regular changeset bundle as confirmed low-risk changesets;

creating a primary bundle from said confirmed low-risk changesets;

executing said pre-commit quality verification on said primary bundle against a current software development version label; and committing at least some successfully verified low-risk changesets in said primary bundle to invoke a new software development version label to be set as said current software development version label in subsequent primary bundle verifications;

wherein a plurality of said regular changeset bundles are formed and verified in parallel to concurrently populate a low-risk changeset pool with said confirmed low-risk changesets; and wherein a single said primary bundle is created at any one time from said low-risk changeset pool.

8. The non-transitory computer-readable medium of claim 7, wherein said primary bundle is serially created and committed.

9. The non-transitory computer-readable medium of claim 7, further comprising statements and instructions to:

create at least one preliminary changeset bundle from said submitted software changesets;

execute one or more predefined automated preliminary quality verifications on said at least one preliminary changeset bundle;

promote at least some successfully preliminarily verified software changesets in said at least one preliminary changeset bundle to a pre-commit changeset pool, wherein said at least one regular changeset bundle is created from said pre-commit changeset pool;

isolate a blocking changeset as causing any said preliminary changeset bundle to fail any of said one or more predefined automated preliminary quality verifications; and reject said blocking changeset.

10. The non-transitory computer-readable medium of claim 7, further comprising statements and instructions to:

sequentially verify said submitted software changesets across multiple preliminary verification stages, each one of which comprising:

create at least one preliminary changeset bundle;

execute a predefined automated preliminary quality verification on said at least one preliminary changeset bundle;

promote successfully verified changesets in said at least one preliminary changeset bundle to a subsequent preliminary verification stage;

populate a pre-commit regular changeset pool with changesets having been successfully sequentially verified across all of said multiple preliminary verification stages, from which to create said at least one regular changeset bundle;

isolate a blocking changeset as causing any said preliminary changeset bundle to fail any said predefined automated preliminary quality verification; and reject said blocking changeset.

11. The non-transitory computer-readable medium of claim 7, further comprising statements and instructions to:

isolate a blocking changeset as causing any one of said regular bundles and said primary bundle to fail said pre-commit verification; and reject said blocking changeset pre-committal.

12. The non-transitory computer-readable medium of claim 7, further comprising statements and instructions to execute a post-commit verification on said new software development version label.

\* \* \* \* \*